United States Patent
Watanabe

(10) Patent No.: US 8,223,398 B2
(45) Date of Patent: Jul. 17, 2012

(54) PRINT DATA GENERATING DEVICE, METHOD TO GENERATE PRINT DATA, AND COMPUTER USABLE MEDIUM THEREFOR

(75) Inventor: Takeshi Watanabe, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 686 days.

(21) Appl. No.: 12/320,181

(22) Filed: Jan. 21, 2009

(65) Prior Publication Data

US 2009/0225337 A1 Sep. 10, 2009

(30) Foreign Application Priority Data

Mar. 6, 2008 (JP) ................................ 2008-055665

(51) Int. Cl.
*G06F 15/00* (2006.01)
(52) U.S. Cl. ............................ 358/1.9; 382/199; 382/254
(58) Field of Classification Search ........................ None
See application file for complete search history.

(56) References Cited

U.S. PATENT DOCUMENTS

| | | | |
|---|---|---|---|
| 4,680,058 A * | 7/1987 | Shimizu et al. ............ | 106/31.65 |
| 5,130,935 A | 7/1992 | Takiguchi | |
| 5,313,570 A * | 5/1994 | Dermer et al. ............... | 345/589 |
| 5,335,097 A | 8/1994 | Murakami | |
| 6,290,330 B1 * | 9/2001 | Torpey et al. .................. | 347/43 |
| 6,369,843 B1 | 4/2002 | Springett et al. | |
| 6,808,244 B2 * | 10/2004 | Rosenberger et al. ......... | 347/15 |
| 7,134,749 B2 | 11/2006 | Ben-Zur et al. | |
| 7,362,467 B1 | 4/2008 | Tsukimura | |
| 2002/0031263 A1 * | 3/2002 | Yamakawa ................... | 382/199 |
| 2004/0114158 A1 | 6/2004 | Klassen et al. | |
| 2007/0201062 A1 | 8/2007 | Watanabe | |

(Continued)

FOREIGN PATENT DOCUMENTS

EP 0 648 041 A1 4/1995

(Continued)

OTHER PUBLICATIONS

S. Wood et al, "A Modified Gray Level Morphological Gradient with Accurate Orientation Estimates and Reduced Noise Sensitivity," Signals, Systems and Computers, 2000, Conference Record of the Thirty-Fourth Asilomar Conference, Oct. 29-Nov. 1, 2000, vol. 2, pp. 926-930.

(Continued)

*Primary Examiner* — Twyler Haskins
*Assistant Examiner* — Helen Q Zong
(74) *Attorney, Agent, or Firm* — Oliff & Berridge, PLC

(57) ABSTRACT

A print data generating apparatus to generate print data based on inputted image data representing an image is provided. The print data generating apparatus includes a white data generating unit to generate white data, which indicates color scale values of white being used in the image, a white outline pixel judging unit, which examines a currently marked pixel among pixels included a white area to judge as to whether the marked pixel is a white outline pixel composing an outline of the white area with reference to the white data, and an outline-removed white data generating unit to generate outline-removed white data, which includes information to indicate that the outline of the white area is removed. The outline-removed white data generating unit removes the outline of the white area by clearing the color scale values of white of the white outline pixel to zero.

8 Claims, 16 Drawing Sheets

U.S. PATENT DOCUMENTS

| | | |
|---|---|---|
| 2007/0216920 A1 | 9/2007 | Watanabe |
| 2007/0229911 A1 | 10/2007 | Segawa |
| 2008/0259366 A1* | 10/2008 | Eguchi .......................... 358/1.9 |
| 2009/0225337 A1* | 9/2009 | Watanabe ..................... 358/1.9 |

FOREIGN PATENT DOCUMENTS

| | | |
|---|---|---|
| EP | 1 835 725 A1 | 9/2007 |
| JP | A-62-229478 | 10/1987 |
| JP | A-03-099859 | 4/1991 |
| JP | A-05-293954 | 11/1993 |
| JP | A-6-169393 | 6/1994 |
| JP | A-09-039365 | 2/1997 |
| JP | A-10-235247 | 9/1998 |
| JP | A-11-347468 | 12/1999 |
| JP | A-2000-030016 | 1/2000 |
| JP | A-2000-232590 | 8/2000 |
| JP | A-2001-199089 | 7/2001 |
| JP | A-2007-228316 | 9/2007 |
| JP | A-2007-266847 | 10/2007 |
| JP | A-2007-282205 | 10/2007 |

OTHER PUBLICATIONS

Search Report issued in European Patent Application No. 09001014.1, on Jun. 10, 2010.

Feb. 7, 2012 Office Action issued in Japanese Application No. 2008-055665 (with English Translation).

Feb. 7, 2012 Office Action issued in Japanese Application No. 2008-089462 (with English Translation).

* cited by examiner

| COLOR CONVERSION TABLE |||||||
|---|---|---|---|---|---|---|
| sRGB SCALE VALUE ||| CMYK SCALE VALUE ||||
| R | G | R | C | M | Y | K |
| 0 | 0 | 0 | 0 | 0 | 0 | 0 |
| 64 | 0 | 0 | 0 | 32 | 45 | 0 |
| 128 | 0 | 0 | 0 | 101 | 123 | 0 |
| 192 | 0 | 0 | 0 | 190 | 210 | 0 |
| 255 | 0 | 0 | 0 | 255 | 250 | 0 |
| 0 | 64 | 0 | 50 | 23 | 10 | 10 |
| 64 | 64 | 0 | 100 | 32 | 45 | 35 |
| 128 | 64 | 0 | 80 | 62 | 70 | 55 |
| 192 | 64 | 0 | 20 | 102 | 190 | 15 |
| 255 | 64 | 0 | 0 | 180 | 250 | 0 |
| ... | ... | ... | ... | ... | ... | ... |
| 0 | 192 | 255 | 255 | 20 | 0 | 0 |
| 64 | 192 | 255 | 190 | 21 | 0 | 0 |
| 128 | 192 | 255 | 128 | 31 | 0 | 0 |
| 192 | 192 | 255 | 54 | 25 | 0 | 0 |
| 255 | 192 | 255 | 0 | 20 | 0 | 0 |
| 0 | 255 | 255 | 255 | 10 | 0 | 0 |
| 64 | 255 | 255 | 198 | 2 | 0 | 0 |
| 128 | 255 | 255 | 130 | 0 | 0 | 0 |
| 192 | 255 | 255 | 55 | 0 | 0 | 0 |
| 255 | 255 | 255 | 0 | 0 | 0 | 0 |

162

| WHITE CONVERSION TABLE ||||
| sRGB SCALE VALUE ||| W SCALE VALUE |
| R | G | R | C |
|---|---|---|---|
| 0 | 0 | 0 | 0 |
| 64 | 0 | 0 | 30 |
| 128 | 0 | 0 | 100 |
| 192 | 0 | 0 | 150 |
| 255 | 0 | 0 | 255 |
| 0 | 64 | 0 | 32 |
| 64 | 64 | 0 | 120 |
| 128 | 64 | 0 | 145 |
| 192 | 64 | 0 | 180 |
| 255 | 64 | 0 | 255 |
| ... | ... | ... | ... |
| 0 | 192 | 255 | 250 |
| 64 | 192 | 255 | 251 |
| 128 | 192 | 255 | 253 |
| 192 | 192 | 255 | 254 |
| 255 | 192 | 255 | 255 |
| 0 | 255 | 255 | 255 |
| 64 | 255 | 255 | 251 |
| 128 | 255 | 255 | 245 |
| 192 | 255 | 255 | 250 |
| 255 | 255 | 255 | 255 |

FIG. 8

PRINT DATA GENERATING DEVICE, METHOD TO GENERATE PRINT DATA, AND COMPUTER USABLE MEDIUM THEREFOR

CROSS REFERENCE TO RELATED APPLICATION

This application claims priority from Japanese Patent Application No. 2008-055665, filed on Mar. 6, 2008, the entire subject matter of which is incorporated herein by reference.

BACKGROUND

1. Technical Field

Aspects of the present invention relate to a print data generating device, a method to generate print data, and a computer usable medium therefor, and more specifically, to a device, a method, and a computer usable medium to generate print data which is suitable for printing an image in inks including white ink.

2. Related Art

Conventionally, an inkjet printing apparatus, which ejects a plurality of colors of inks and white ink onto a recording medium, has been known. In the inkjet printing apparatus, the inks are drawn from ink reservoirs to a plurality of ejecting channels provided in an inkjet head and ejected from nozzles at the end of the ejecting channels when actuators such as heater elements and piezoelectric elements are selectively activated. When an image is formed in colors, each of pixels composing the image is resolved, for example, into the three primary colors, which are cyan (C), magenta (M), and yellow (Y), thereafter, a colored pixel is formed as the inks adjusted in their densities are ejected onto the recording medium. In addition, a pixel in a black color is reproduced by blending the colored inks or using black (K) ink. Further, opaque white (W) ink can be used to reproduce white pixels and to form a base layer on a dark-colored (i.e., black) recording medium so that pixels in the three primary colors (transparent) can be reproduced clearly over the base layer regardless of a color of the recording medium. Thus, images reproduced in higher quality can be obtained without being limited by colors and lightness of the recording media.

When drops of the inks ejected from the nozzles are missed or blotted out of intended positions upon printing, the quality of the image can be undesirably degraded. In order to avoid the blots, methods to align the positions of the ink drops to be ejected have been suggested; however, accurate positioning of the ink drops has been yet difficult. Moreover, such methods do not dissolve blots, and the problem caused by the blots remains unsolved. In order to overcome blots of black ink specifically, methods to adjust amounts of colored inks in outline areas which are in black have been suggested in, for example, Japanese Patent Provisional Publications Nos. 2001-199089 and 2000-232590.

SUMMARY

The above methods may be effective in covering the blots in black ink by the adjusted outline areas. However, these methods have not been effectively employed when the outline areas are printed in white ink. When the white ink is used for the base layer, and when amounts of the colored inks to be placed over the base layer are changed, coloration of the adjusted outline areas may not be maintained but changed due to the highest brightness of white. Moreover, the white ink may be placed in a plurality of layers by a plurality of inkjet heads in order to assure whiteness; therefore, an amount of the white ink to be used in the areas increases, and blots may be easily caused. Thus, it has been difficult to improve the quality of printed images while blots of the white ink are desirably controlled.

In view of the above drawbacks, the present invention is advantageous in that a print data generating apparatus, a method to generate print data, and a computer usable medium therefor, by which print data to print an image is generated while blots of white ink against colored inks can be avoided, are provided.

According to an aspect of the invention, a print data generating apparatus to generate print data, which is to be used in a printing apparatus to form an image, based on inputted image data representing the image, is provided. The print data generating apparatus includes a white data generating unit to generate white data, which indicates color scale values of white being used in the image, based on the inputted image data, a white outline pixel judging unit, which examines a currently marked pixel among pixels included a white area to judge as to whether the marked pixel is a white outline pixel composing an outline of the white area with reference to the white data, the white area being an area including a pixel to be formed in a white colorant, and an outline-removed white data generating unit to generate outline-removed white data, which includes information to indicate that the outline of the white area is removed. The outline-removed white data generating unit removes the outline of the white area by clearing the color scale values of white of the white outline pixel to zero.

According to another aspect of the invention, a method to generate print data to be used in a printing apparatus to form an image, based on originally inputted image data representing the image, is provided. The method includes generating white data, which indicates color scale values of white being used in the image, based on the inputted image data, examining a currently marked pixel among pixels included a white area to judge as to whether the marked pixel is a white outline pixel composing an outline of the white area with reference to the white data, the white area being an area including a pixel to be formed in a white colorant, and generating outline-removed white data, which includes information to indicate that the outline of the white area is removed. In the step of generating the outline-removed white data, the outline of the white area is removed by clearing the color scale values of white of the white outline pixel to zero.

According to still another aspect of the invention, a computer usable medium to include computer readable instructions to control a computer to generate print data, which is to be used in a printing apparatus to form an image, based on inputted image data representing the image, is provided. The computer readable instructions control the computer to execute steps of generating white data, which indicates color scale values of white being used in the image, based on the inputted image data, examining a currently marked pixel among pixels included a white area to judge as to whether the marked pixel is a white outline pixel composing an outline of the white area with reference to the white data, the white area being an area including a pixel to be formed in a white colorant, and generating outline-removed white data, which includes information to indicate that the outline of the white area is removed. In the step of generating the outline-removed white data, the outline of the white area is removed by clearing the color scale values of white of the white outline pixel to zero.

BRIEF DESCRIPTION OF THE ACCOMPANYING DRAWINGS

FIG. 8 illustrates a data configuration of a white conversion table according to the first embodiment of the present invention.

DETAILED DESCRIPTION

Hereinafter, embodiments according to aspects of the present invention will be described with reference to the accompanying drawings.

Figure 1:
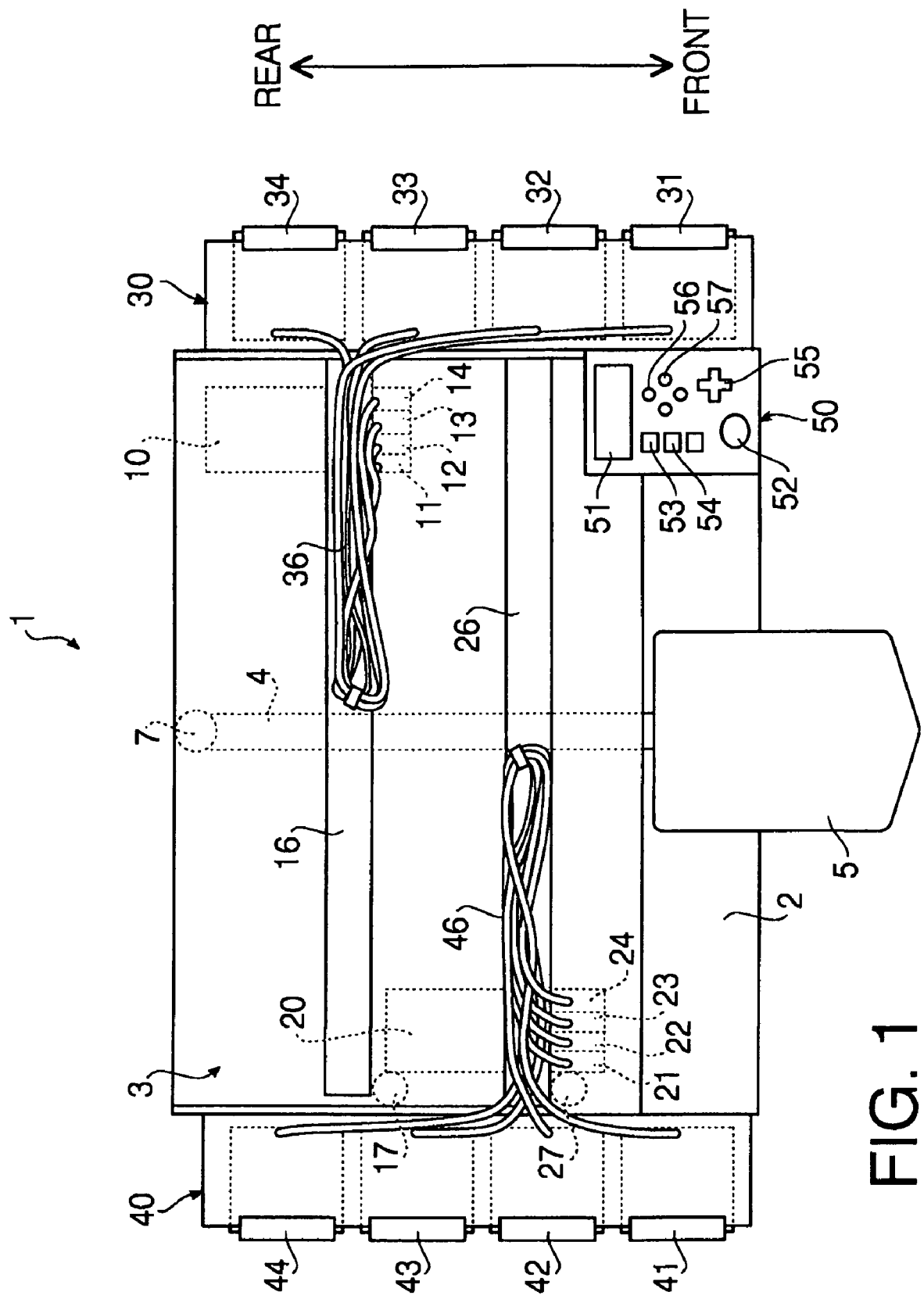
FIG. 1 is a plane view of an inkjet printer according to a first embodiment of the present invention.

An inkjet printer 1 according to an embodiment of the present invention will be described with reference to FIG. 1. The inkjet printer 1 is a printing apparatus, which is capable of printing an image on a piece of fabric. FIG. 1 is a plane view of the inkjet printer 1 according to the first embodiment of the present invention.

As shown in FIG. 1, the inkjet printer 1 includes a flat base plate 2 at a bottom and a cover 3 to cover the entire body of the inkjet printer 1. The base plate 2 has longer sides which extend in a right-and-left (horizontal) direction in FIG. 1, and a rail 4 is aligned in parallel with a front-rear direction as indicated by an arrow at an approximate center of the base plate 2. The rail 4 supports a platen 5, which is interchangeable and movable in the front-rear direction (i.e., an auxiliary direction) along the rail 4. The platen 5 is carried along the rail 4 by a platen drive motor 7 being a stepping motor, which is provided at a rear end portion of the rail 4. The platen 5 is a substantially rectangular-shaped plate, on which a recording medium (e.g., a T-shirt) is placed.

At an approximately center but a relatively rear (i.e., closer to an upper side in FIG. 1) of the cover 3, above the platen 5, a first guide rail 16 to guide a first carriage 10 with four inkjet heads 11-14 mounted thereon is provided. In the vicinity of a left-hand end of the first guide rail 16, a first carriage motor 17 to drive the carriage 10 is provided, while a pulley (not shown) is provided in the vicinity of a right-hand end of the first guide rail 16. Further, a carriage belt (not shown) is drawn between the first carriage motor 17 and the pulley under the first guide rail 16. The carriage belt is fixed to the first carriage 10 so that the first carriage 10 is reciprocated along the first guide rail 16 in the right-and-left direction (i.e., a main scanning direction) when the carriage motor 17 is activated.

On the right-hand end of the cover 3, a first ink cartridge storage 30, in which four ink cartridges 31-34 having inks therein are detachably attached, is provided. Each of the ink cartridges 31-34 is connected to each of inkjet heads 11-14 by flexible ink supplying tubes 36 so that the inks stored in the ink cartridges 31-34 are supplied to each channel of the inkjet heads 11-14. According to the present embodiment, all of the inkjet heads 11-14 are provided to eject opaque white ink therefrom, and the ink cartridges 31-34 respectively contain opaque white ink.

At an approximately center but a relatively front (i.e., closer to a lower side in FIG. 1) portion of the cover 3, above the platen 5, a second guide rail 26, in parallel with the first guide rail 16, to guide a second carriage 20 with four inkjet heads 21-24 mounted thereon is provided. Further, a carriage belt (not shown) is drawn between the second carriage motor 27 and a pulley (not shown) under the second guide rail 26. The carriage belt is fixed to the second carriage 20 so that the second carriage 20 is reciprocated along the second guide rail 26 in the right-and-left direction (i.e., the main scanning direction) when the carriage motor 27 is activated.

In a left-end portion of the cover 3, a second ink cartridge storage 40, in which four ink cartridges 41-44 are stored, is provided. The ink cartridges 41-44 are respectively connected to the inkjet head 21-24 through ink supplying tubes 46 so that the inks in the ink cartridges 41-44 are supplied to each channel of the inkjet heads 21-24. The four ink cartridges 41-44 contain cyan (C) ink, magenta (M) ink, yellow (Y) ink, and black (K) ink respectively.

Each of the inkjet heads 11-14 in the first carriage 10 and the inkjet heads 21-24 in the second carriage 20 is provided with a plurality of (for example, 128) ejection channels (not shown) through which the ink is conveyed. Each of the channels is provided with a piezoelectric actuator (not shown), which is activated individually, to eject an ink drop downward onto the recording medium from ejection nozzles (not shown) that are open at a nozzle surface of each of the inkjet heads 11-14, 21-24. Further, at one of the right-hand end and the left-hand end of the reciprocative range of each of the first and second carriages 10, 20, a maintenance mechanism (not shown) such as a capping unit and a purge unit for the inkjet heads 11-14, 21-24 is provided.

At right-hand front of the inkjet printer 1 is provided an operation panel 50 to which a user inputs an instruction for the inkjet printer 1. The operation panel 50 includes a display 51, a print start button 52, a print cancel button 53, and a platen feed button 54, a direction key 55, an error indicator 56, and a data reception indicator 57. The display 51 is to display various information concerning, for example, operations in the inkjet printer 1. The print start button 52 is a button to be operated when a print operation is started. The cancel button 53 is a button to be operated when the print operation is ceased. When the platen feed button 54 is operated, the platen 5 is moved to a position wherein the fabric such as a T-shirt as the recording medium can be set on and removed from the platen 5. The direction key 55 is operated when, for example, the user selects an option concerning operations to be executed. The error indicator is a lamp to be lit when an error occurs in the inkjet printer 1. The data reception indicator 57 is a lamp to be lit when print data is received in the inkjet printer 1.

Figure 2:
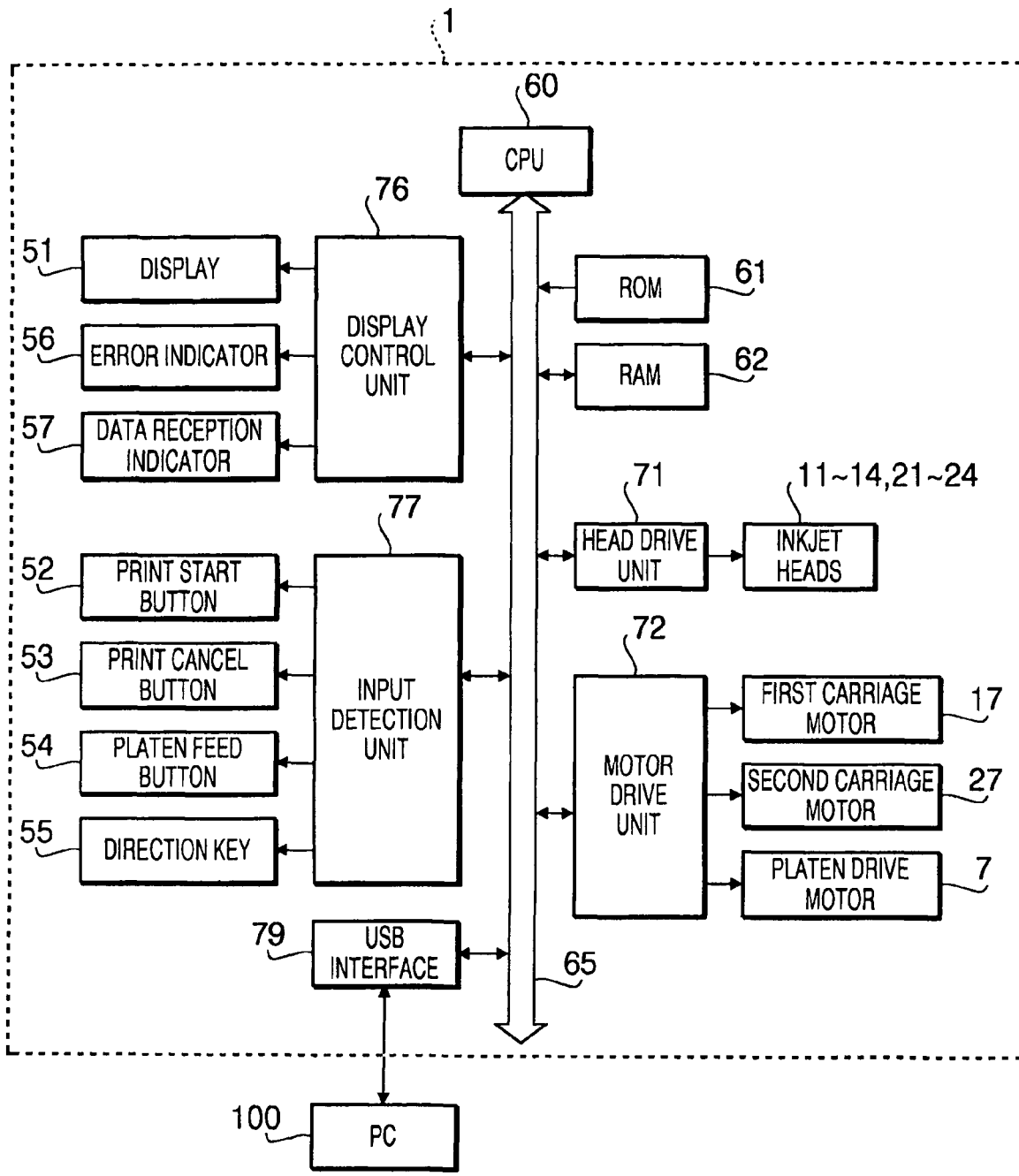
FIG. 2 is a block diagram to illustrate an electrical configuration of the inkjet printer according to the first embodiment of the present invention.

Next, referring to FIG. 2, an electrical configuration of the inkjet printer 1 will be described. FIG. 2 is a block diagram showing the electrical configuration of the inkjet printer 1 according to the present embodiment of the invention. As shown in FIG. 2, the inkjet printer 1 is provided with a CPU 60 that controls the entire operation in the inkjet printer 1. The CPU 60 is connected with a ROM 61, a RAM 62, a head drive unit 71, a motor drive unit 72, a display control unit 76, an input detection unit 77, and a USB interface 79. These components are connected to one another through a bus 65.

The ROM 61 includes a program storage area, wherein control programs to be executed by the CPU 60 to control operations of the inkjet printer 1 and printing programs to be executed for the printing operations are stored, and a program-related information storage area, wherein various information such as parameter settings, initial values, and data to be used in the programs are stored. Further, the ROM 61 may include various storage areas.

The RAM 62 in the inkjet printer 1 is provided with several areas including a received print data storing area for storing the print data transmitted from a PC 100, an in-printing data storing area for storing the print data being printed, and various information storing areas for storing various setting information.

The head drive unit 71 is connected to each of the inkjet heads 11-14, 21-24, and activates the piezoelectric actuators being provided to each channel of the inkjet heads 11-14, 21-24.

The motor drive unit 72 is connected to the first carriage motor 17, the second carriage motor 27, and a platen drive motor 7, which drives a platen roller (not shown) to adjust timing and speed to feed the platen 5 holding the fabric as a recording medium. Thus, the first and the second carriage motors 17, 27, and the platen drive motor 7 are controlled by the motor drive unit 72.

The display control unit 76 executes displaying processes of the display 51, the error indicator 56, and the data reception indicator 57, which are connected to the CPU 60 through the bus 65. The input detection unit 77 detects inputs through the print start button 52, the print cancel button 53, the platen feed button 54, and the direction key 55, which are connected to the CPU 60 through the bus 65. The USB interface 79 which allows communication between the inkjet printer 1 and external devices including the PC 100 through a USB cable (not shown).

With the aforementioned configuration of the inkjet printer 1 according to the embodiment, when the print data transmitted from the PC 100 is received in the inkjet printer 1, the user sets a piece of fabric on the platen 5 and presses the print button 52. Accordingly, the platen 5 with the fabric is moved to rearward in the cover 3 of the inkjet printer 1 along the rail 4 by the platen drive motor 7 so that the position of the first carriage 10 with respect to the platen 5 corresponds to a recording start position. Thereafter, the inkjet heads 11-14 eject the inks as the first carriage 10 is moved from the right-hand side to the left-hand side in the cover 3 according to a recording instruction so that recording of one line is executed. Further, the platen 5 is moved to frontward from the rearward in the cover 3 for an amount corresponding to one line, and the inkjet heads 11-14 eject the inks as the first carriage 10 is moved from the right-hand side to the left-hand side in the cover 3 according to the recording instruction so that recording of the next line is executed. Subsequently, the platen 5 is moved to frontward from the rearward in the cover 3 for the amount corresponding to another one line portion. By repeating this operation, printing in white ink is executed. Next, the inkjet printer 1 moves the platen 5 with the fabric to frontward so that the position of the second carriage 20 with respect to the platen 5 corresponds to the recording start position. The second carriage 20 is driven similarly to the first carriage 10 as described above so that the colored (CMYK) inks are ejected onto the fabric according to the recording instruction. At the end of the printing operation, the platen 5 is fed forth to a position wherein the fabric can be removed, thus the user removes the fabric which underwent the printing operation.

Figure 3:
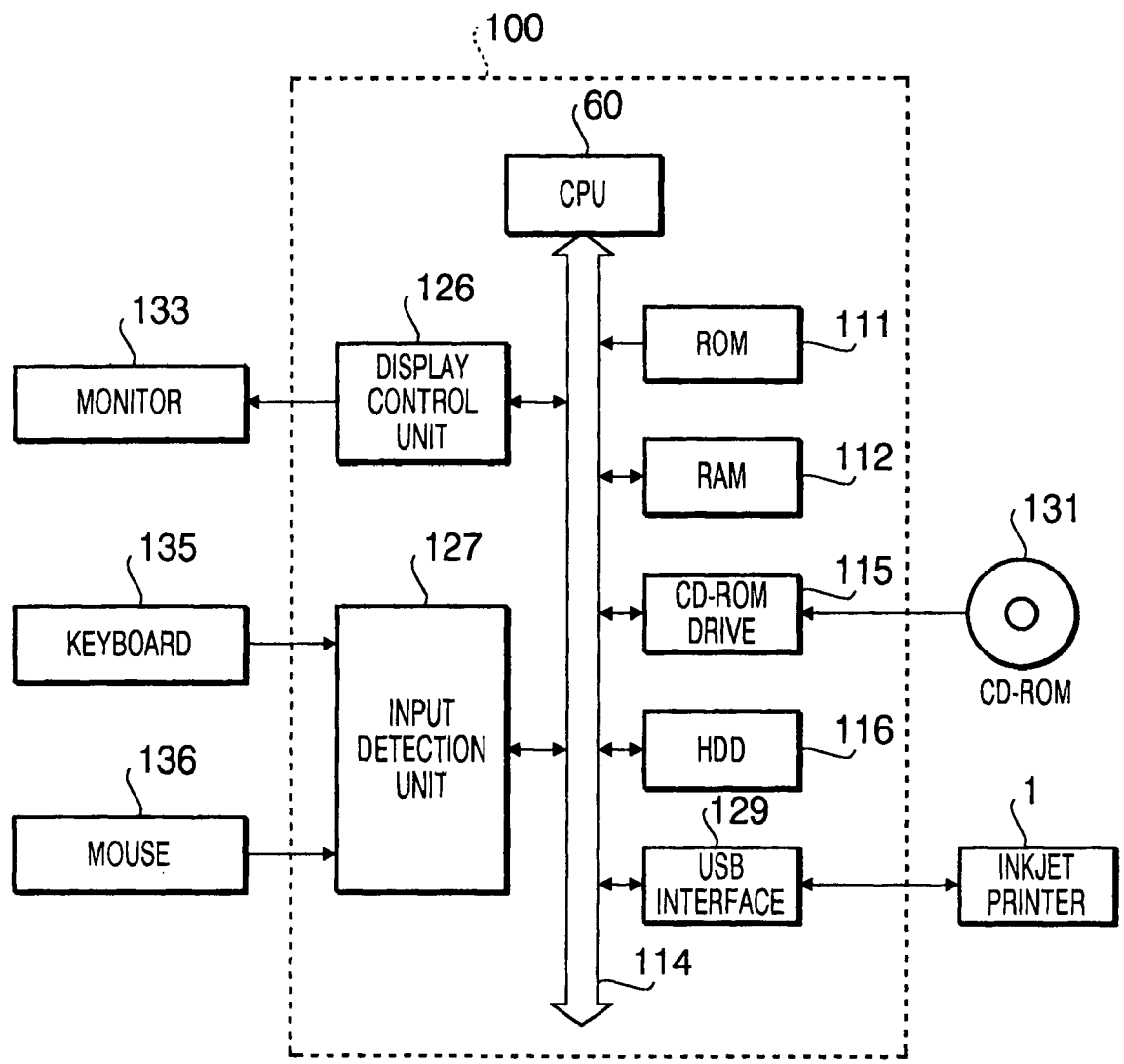
FIG. 3 is a block diagram to illustrate an electrical configuration of a PC (personal computer) according to the first embodiment of the present invention.
Figure 4:
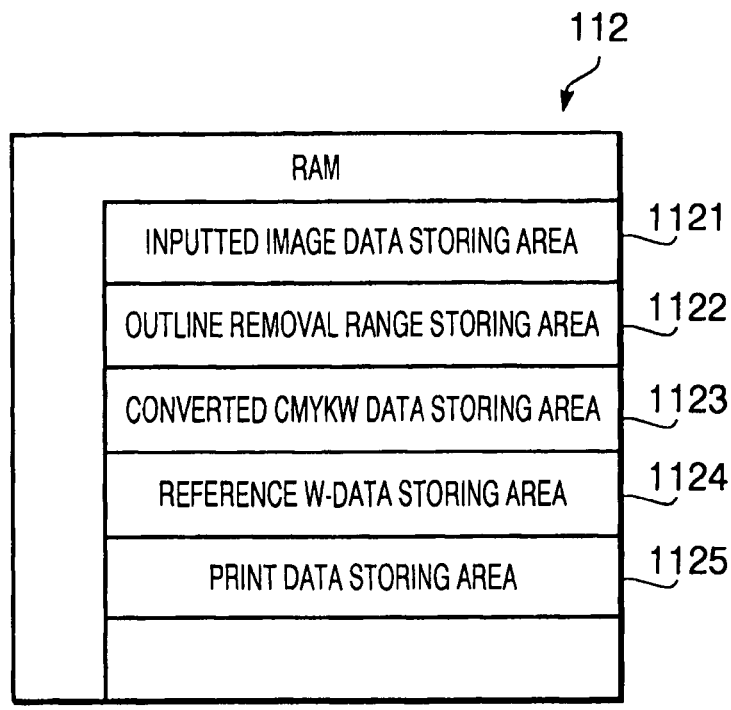
FIG. 4 is a schematic diagram of a RAM (random access memory) in the PC according to the first embodiment of the invention.
Figure 5:
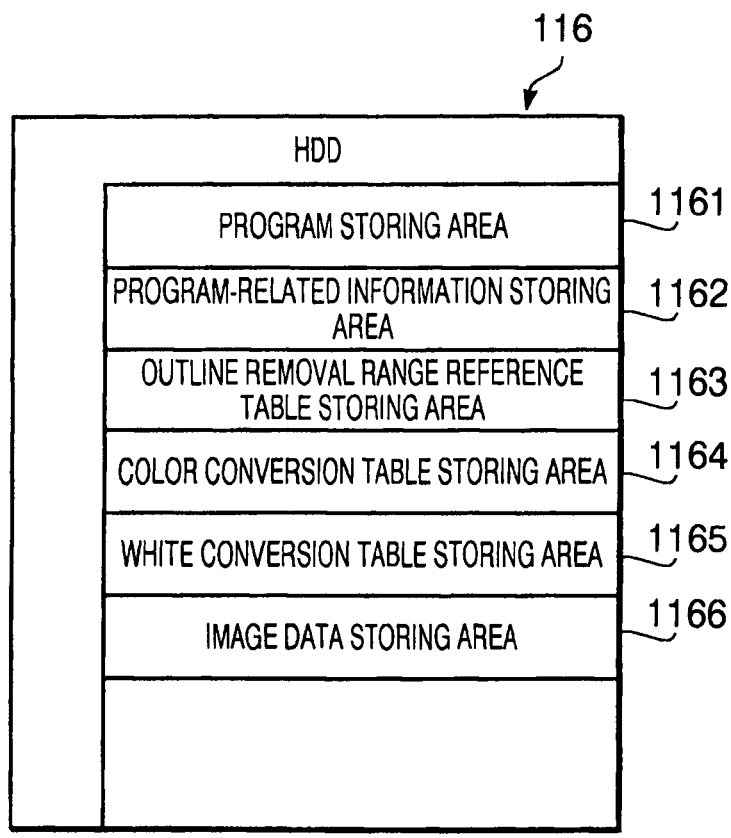
FIG. 5 is a schematic diagram of an HDD (hard disk drive) in the PC according to the first embodiment of the invention.

Next, a configuration of the PC 100 will be described with reference to FIGS. 3-5. FIG. 3 is a block diagram of an electrical configuration of the PC 100 according to the present embodiment of the invention. FIG. 4 is a schematic diagram of a RAM 112 in the PC 100 according to the present embodiment of the invention. FIG. 5 is a schematic diagram of an HDD 116 in the PC 100 according to the present embodiment of the invention. The PC 100 is connected to the inkjet printer 1 through a standardized communication cable, which is for example a USB. In the PC 100, print data is generated based on image data created by the user using various applications, and the print data is transmitted to the inkjet printer 1.

As shown in FIG. 3, the PC 100 is provided with a CPU 110 which controls the entire operation in the PC 100. The CPU 110 is connected with a ROM 111, a RAM 112, a CD-ROM drive 115, an HDD 116, a display control unit 126, an input detection unit 127, and a USB interface 129. These components are connected to one another through a bus 114.

The ROM 111 stores various information to be used in controlling programs, such as BIOS, to be executed by the CPU 110. The CD-ROM drive 115 is for reading data from a CD-ROM 131 inserted therein as a storage medium of data. The CD-ROM 113 stores data including a printer driver, which is a program to create the print data, and various settings, tables, and data to be used in the program. The data in the CD-ROM 113 is read by the CD-ROM drive 115 and stored in predetermined areas (see FIG. 5) in the HDD 116.

The display control unit 126 controls displaying processes to display information concerning an operation on a screen of a monitor 133. The input detection unit 127 is connected to input devices including a keyboard 135 and a mouse 136, which are operated by the user, and operations by the user to the input devices are detected by the input detection unit 127. The USB interface 129 allows communication between the PC 100 and external devices including the inkjet printer 1 through a USB cable (not shown).

As shown in FIG. 4, the RAM 112 is provided with several storage areas including an inputted image data storing area 1121, an outline removal range storing area 1122, a converted CMYKW data storing area 1123, a reference W-data storing area 1124, and a print data storing area 1125. The inputted image data storing area 1121 is a storage area for temporarily storing originally inputted image data 141 (see FIG. 6). The print data for printing an image is created based on the image data being stored in the inputted image data storing area 1121. The outline removal range storing area 1122 is a storage area for storing an n value, indicating a range to be removed from outlines of white areas, which are areas including a portion to be painted in the white ink. The outlines of a white area is a predetermined thickness along edges of the white area. The converted CMYKW data storing area 1123 is a storage area for storing converted CMYKW data 146 (see FIG. 6), which is converted from the inputted image data 141. The reference W-data storing area 1124 is a storage area for storing reference W-data, which is referred to in order to judge as to whether a pixel currently at issue is in a position to compose an outline of an area in white. The print data storing area 1125 is a storage area for storing print data 148 (see FIG. 6), which is created based on outline-removed white data 147 (see FIG. 6). Functions of the above-mentioned data will be described later in detail.

As shown in FIG. 5, the HDD 116 contains several storage areas including a program storing area 1161, a program-related information storing area 1162, an outline removal range reference table storing area 1163, a color conversion table storing area 1164, a white conversion table storing area 1165, an image data storing area 1166. The program storing area 1161 is a storage area for storing various programs to be executed in the PC 100 including the printer driver. The program-related information storing area 1162 is a storage area for storing information concerning settings, initial values, and data necessary for executing the programs. The outline removal range reference table storing area 1163 is a storage area for storing an outline removal range reference table 160 (see FIG. 9), which defines correspondence between a type of a recording medium being determined by the user and the n value indicating the range to be removed in an outline of a white area. The color conversion table storing area 1164 is a storage area for storing a color conversion table 161 (see FIG. 7). The color conversion table 161 defines correspondence between color information of the inputted image data 141, which is represented in sRGB (red, green, blue) format, and a colored ink level, which is represented in a CMYK format. The color conversion table 161 is thus used for converting the inputted image data 141 into a colored ink level in CMYK format. The white conversion table storing area 1165 is a storage area for storing a white conversion table 162 (see FIG. 8), which is for converting the inputted image data 141 into a white ink level (in a W format). The image data storing area 1166 is a storage area for storing a plurality of pieces of image data 141. Functions of the above-mentioned data will be described later in detail.

Figure 6:
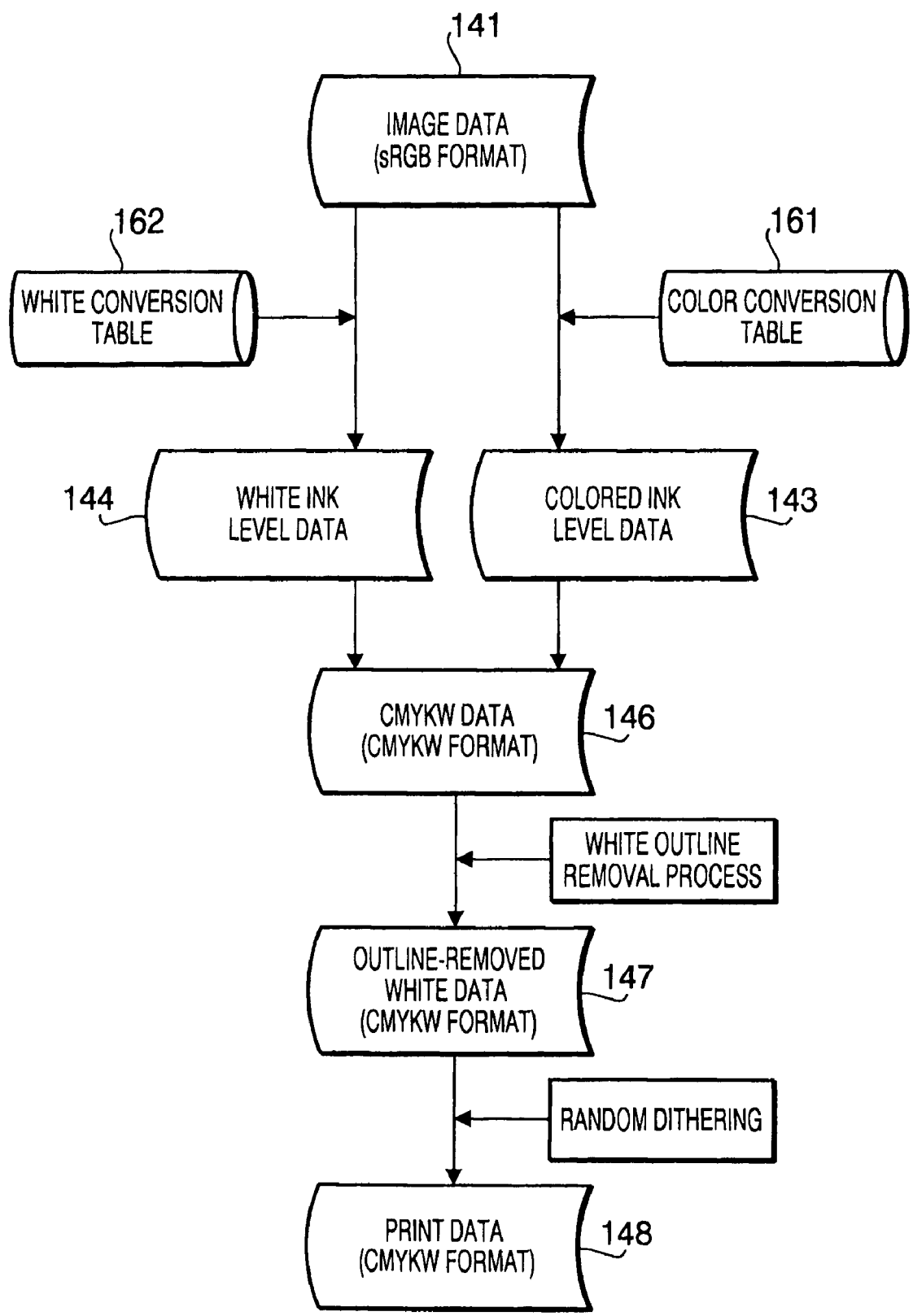
FIG. 6 illustrates transition of data in a print data generating process according to the first embodiment of the invention.
Figure 7:
FIG. 7 illustrates a data configuration of a color conversion table according to the first embodiment of the present invention.
Figures 9, 10:
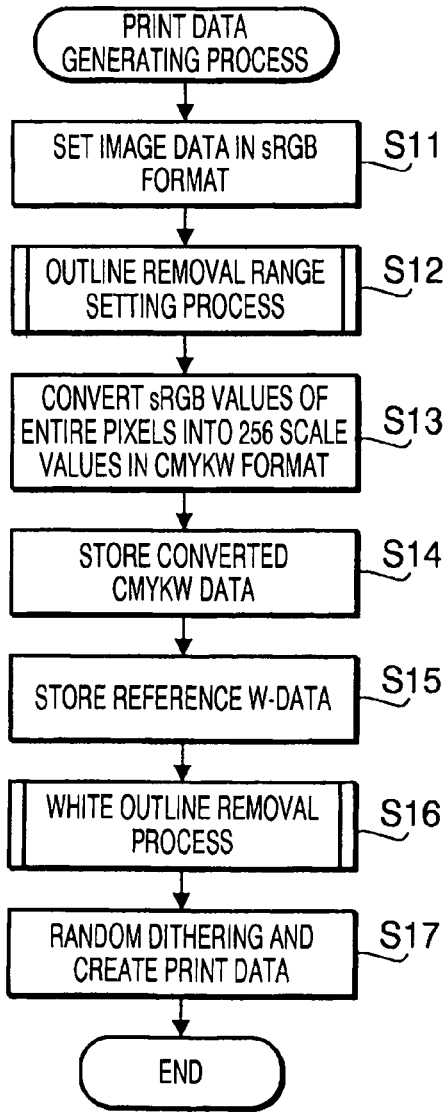
FIG. 9 illustrates a data configuration of an outline removal area reference table according to the first embodiment of the present invention.
FIG. 10 is a flowchart to illustrate the print data generating process to be executed in the PC 100 according to the first embodiment of the present invention.

Hereinafter, with reference to FIGS. 6-9, the data to be generated in the print data generating process according to the present embodiment will be described. FIG. 6 illustrates transition of data in the print data generating process according to the first embodiment of the invention. FIG. 7 illustrates a data configuration of the color conversion table 161 according to the first embodiment of the present invention. FIG. 8 illustrates a data configuration of the white conversion table 162 according to the first embodiment of the present invention. FIG. 9 illustrates a data configuration of the outline removal area reference table 160 according to the first embodiment of the present invention.

As shown in FIG. 6, the print data 148 is generated based on the image data 141 stored in the inputted image data storing area 1121 in the RAM 112. The image data 141 is the data specified to be printed by the user among a plurality of pieces of image data which have been created by the user using various applications such as an application designed for editing graphics. Thus, the image data 141 is saved in the image data storing area 1166 of the HDD 116. Specifically, the image data according to the present embodiment is represented in 256 color scale of the image data in sRGB format. The sRGB is an international standard of color space established by the IEC (International Electrotechnical Commission), and various PC peripherals including digital cameras, printers, and monitors perform color adjustment according to the sRGB to minimize a color difference between the inputted color and output color.

When an image is printed in a printing apparatus such as the inkjet printer 1 by ejecting the inks, a color of each pixel composing the image, represented in the sRGB format, is converted into CMYKW format to be CMYKW data 146. The CMYKW format is a method to reproduce a color in cyan (C), magenta (M), yellow (Y), black (K), and white (W). A color of each pixel is defined by combination of the C-scale value, M-scale value, Y-scale value, K-scale value, and W-scale value, which are respectively defined in 256 color scales. The image data 141 is converted into the CMYKW data 146 based on the color conversion table 161 and the white conversion table 162.

The color conversion table 161 is a table for converting the input data in 256 color scale in the sRGB format into the output data in 256 color scale in the CMYK format. As shown in FIG. 7, each of the CMYK scale values is defined to correspond to an sRGB scale value respectively. The sRGB scale values of each pixel which composes the image data 141 are converted into the corresponding CMYK scale values respectively based on the color conversion table 161. Thus, the image data 141 is converted in the colored ink level data 143 according to the color conversion table 161. The color conversion table 161 is created in a known method and stored preliminarily in the HDD 116.

Meanwhile, the white ink level data 144 in W format is created in a process such that the sRGB scale values of each pixel which composes the image data 141 are converted into the W-scale values respectively based on the white conversion table 162 stored in the white conversion table storing area 1165 of the HDD 116. The white conversion table 162 is a table for converting the input data in 256 color scale in the sRGB format into the output data in 256 color scale in W format. As shown in FIG. 8, the W-scale value is defined to correspond to each of the sRGB scale values respectively. Further, the sRGB scale values of each pixel which composes the image data 141 are converted into the corresponding W-scale value respectively based on the white conversion table 162. Thus, the image data 141 is converted in the white ink level data 144 according to the white conversion table 162. The converted CMYKW data 146 in 256 color scale is thus composed by the CMYK scale values in the colored ink level data 143 and the W-scale values in the white ink level data 144.

According to the present embodiment, use of the white ink in addition to the CMYK inks enables to form an image with pixels in white on a recording medium with a relatively dark base color such as black. Further, with the white ink, a base layer in white can be formed, and colored pixels can be formed on the white base layer. Thus, images reproduced in higher quality can be obtained without being limited by colors and lightness of the recording media. Moreover, when a plurality of layers of white ink may be formed by the plurality of inkjet heads 11-14 in order to assure whiteness, an amount of the white ink to be used in the areas increases, and blots of the white ink may be easily caused. Accordingly, the white ink in may be blurred out of edges of the desired colored areas.

Therefore, the PC 100 according to the resent embodiment executes a white outline removal process (see FIG. 15) to pixels in the converted CMYKW data 146. In the white outline removal process, each pixel in the converted CMYKW data 146 is examined to determine as to whether the pixel is in an area corresponding to an outline of a white area. Further, when the pixel is determined to be in the outline area of a white area, a W (white) scale value of the pixel is cleared to zero. Thus, outline-removed white data 147, which includes data indicating that the outline of the white area is removed, is created. According to the outline-removed white data 147, blur of the white ink can be prevented.

Additionally, according to the present embodiment, thickness of the outline of the white areas to be removed can be preferably selected according to the outline removal range reference table 160 (see FIG. 9) when the user enters information concerning a type of the recording medium to be used in the inkjet printer 1. The outline removal range reference table 160 is stored in the outline removal range reference table storing area 1163 of the HDD 116. In the outline removal range reference table 160, n values to indicate a preferable thickness of the outline to be removed are stored in association with recording media to be used in the inkjet printer 1. A process to determine the range to be removed in the outline will be described later in detail.

The aforementioned outline-removed white data 147 is further processed in a known random dithering method so that the print data 148, in which a color of each pixel therein is binarized (i.e., indication as to whether each of the CMYK inks is ejected or not ejected), is created. In the present embodiment, the inkjet heads 11-14 are controlled according to binarized W data in the print data 148. Namely, the W data in the print data 148 is commonly used to control the inkjet heads 11-14.

Figure 11:
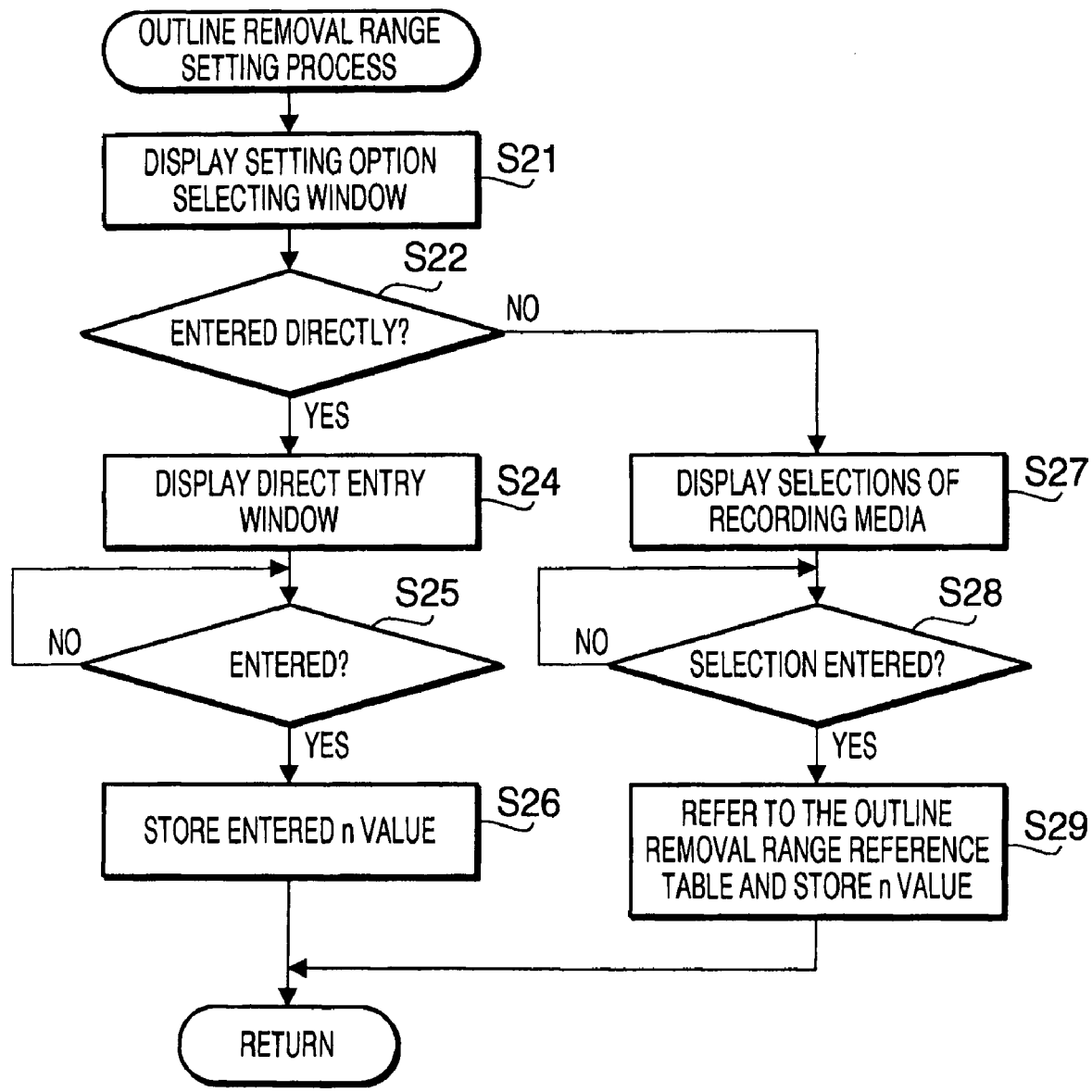
FIG. 11 is a flowchart to illustrate an outline removal range setting process to be executed in the print data generating process according to the first embodiment of the present invention.
Figure 12:
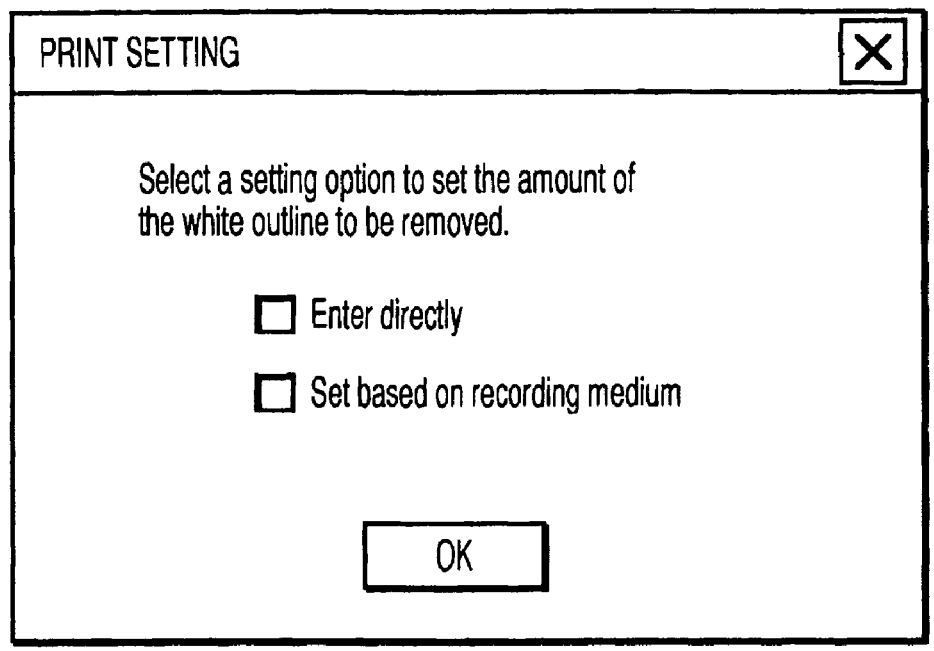
FIG. 12 illustrates a window to select a method for setting the outline removal area, which is displayed on a monitor screen according to the embodiment of the present invention.
Figure 13:
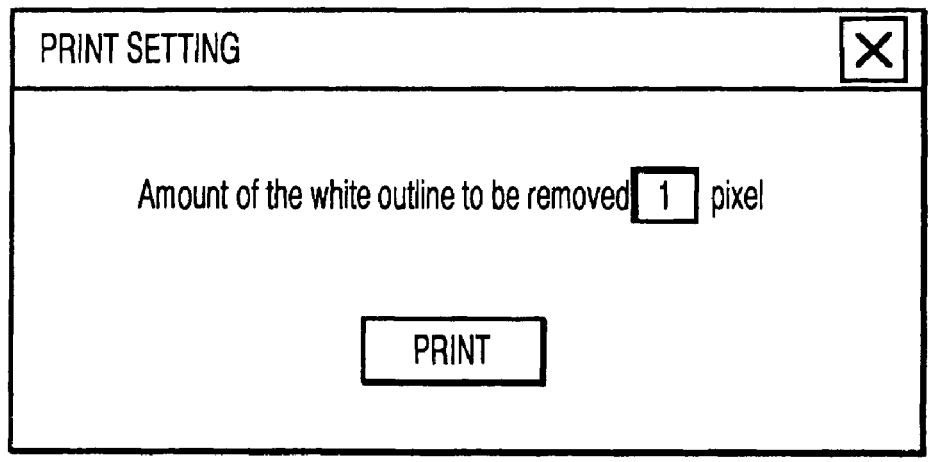
FIG. 13 illustrates a window to input an amount of removal, which is displayed on the monitor screen according to the first embodiment of the present invention.
Figure 14:
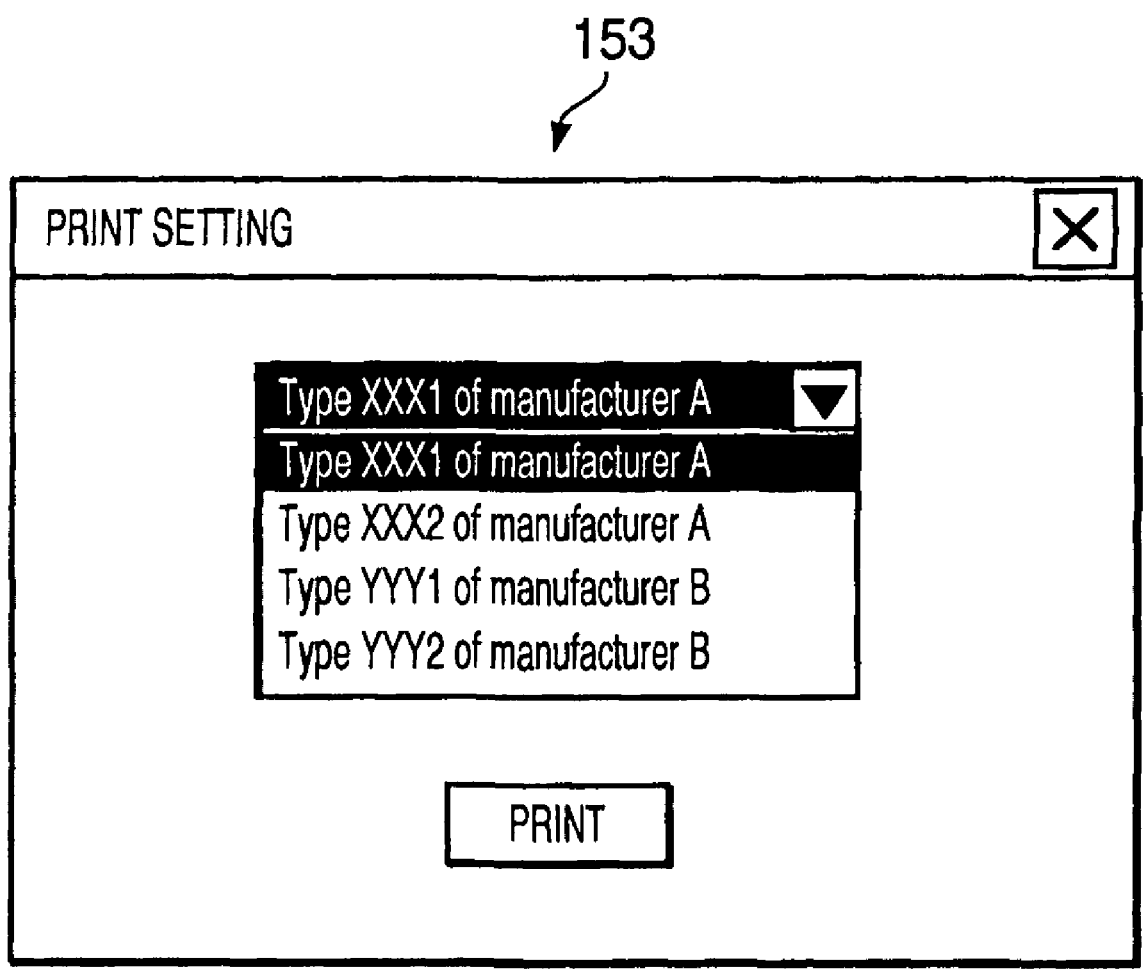
FIG. 14 illustrates a window to select a recording medium, which is displayed on the monitor screen according to the first embodiment of the present invention.
Figure 15:
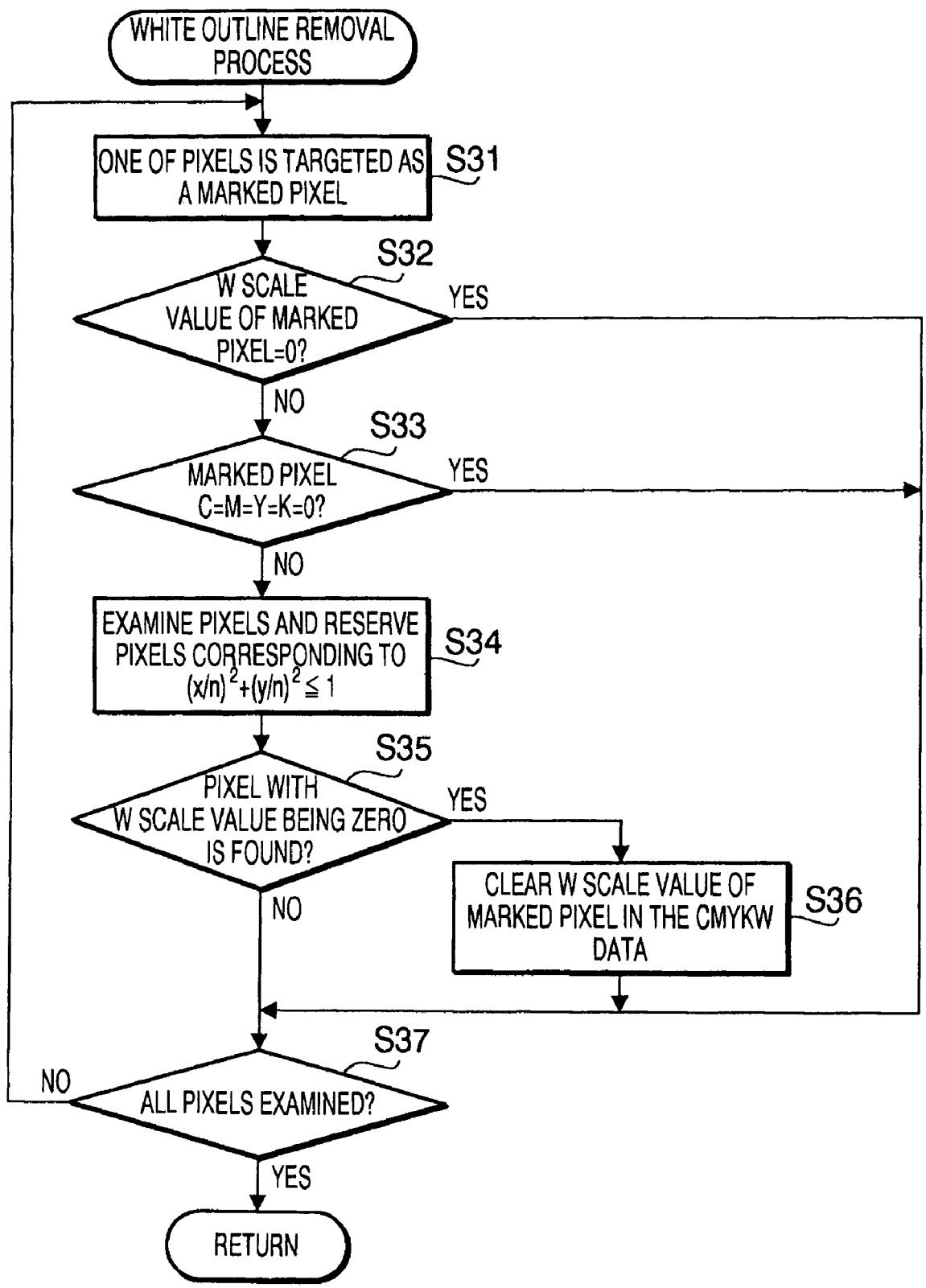
FIG. 15 is a flowchart to illustrate white outline removal process to be executed in the print data generating process according to the first embodiment of the present invention.

Next, the print data generating process according to the present embodiment will be described with reference to FIGS. 10-15. FIG. 10 is a flowchart to illustrate the print data generating process to be executed in the PC 100 according to the first embodiment of the present invention. FIG. 11 is a flowchart to illustrate an outline removal range setting process to be executed in the print data generating process according to the first embodiment of the present invention. FIG. 12 illustrates a window to select a method for setting the outline removal area, which is displayed on a monitor screen according to the first embodiment of the present invention. FIG. 13 illustrates a window to input an amount of the outline to be removal, which is displayed on the monitor screen according to the first embodiment of the present invention. FIG. 14 illustrates a window to select a recording medium, which is displayed on the monitor screen according to the first embodiment of the present invention. FIG. 15 is a flowchart to illustrate white outline removal process to be executed in the print data generating process according to the first embodiment of the present invention.

When an instruction to start a printing operation for the image data 141 is entered by the user in the PC 100, the printer driver is activated, and the CPU 110 starts the print data generating process according to a print data generating program.

When the print data generating process starts, in S11, as shown in FIG. 10, the image data 141 to be printed in the image data storing area 1166 of the HDD 116 is read out to be set in the inputted image data storing area 1121 of the RAM 112. Thereafter, in S12, the outline removal range setting process is executed. In the outline removal range setting process, thickness of the outline to be removed in the white area is determined.

The flow of the outline removal range setting process is illustrated in FIG. 11. In the outline removal range setting process, in S21, a window to present setting options for setting the removal range of the outline to the user is displayed on the screen of the monitor 133. In the present embodiment, the user can select one of two setting options, which are an option to directly enter the n value indicating the thickness of the outline to be removed and an option to specify a type of the recording medium to be used. In the present embodiment, a setting option selecting window 151 is displayed. In the setting option selecting window 151, a message to prompt the user to select one of the two options is displayed along with the two options, which are "enter directly" and "set based on recording medium".

In S22, it is examined to determine as to whether the user selects the option "enter directly." When the user operates the input devices such as the mouse 136 and the keyboard 135 to select the option "enter directly" (S22: YES), in S24, a window in which the user can enter the n value is displayed on the screen of the monitor 133. In the present embodiment, a direct entry window 152 as shown in FIG. 13 is displayed. The user can enter the n value indicating the thickness of the outline to be removed on a pixel basis. In S25, it is examined to determine as to whether the n value is entered. If the n value is not entered (S25: NO), S25 is repeated. If the n value is entered (S25: YES), in S26, the entered n value is stored in the outline removal range storing area 1122 of the RAM 112. The process returns to the print data generating process (FIG. 10).

In S22, if the user selects the option "set based on recording medium" in the setting option selecting window 151 (S22: NO), in S27, a window to select the recording medium to be used is displayed. In the present embodiment, a recording medium selection screen 153 (FIG. 14) is displayed. In the recording medium selection screen 153, the user can select one of a plurality of options. In S28, it is examined as to whether the user's selection is entered. If the user's selection is not entered (S28: NO), S28 is repeated. If the user's selection is entered (S28: YES), in S29, the outline removal range reference table 160 is referred to based on the user's selection, and an n value corresponding to the selected recording medium is stored in the outline removal range storing area 1122 of the RAM 112. The process returns to the print data generating process (FIG. 10).

Referring again to FIG. 10, following the outline removal range setting process (S12), in S13, the image data 141 stored in the inputted image data storing area 1121 is converted into CMYKW data 146. In S13, the image data 141 is converted into the colored ink level data 143 and the white ink level data 144 with reference to the color conversion table 161 and the white conversion table 162 respectively to obtain the CMYKW data 146. In S14, the obtained CMYKW data 146 is stored in the converted CMYKW data storing area 1123 in the RAM 112. Further, in S15, the W data indicating the W (white) scale values in the converted CMYKW data 146 is stored in the reference W-data storing area 1124 independently from the converted CMYKW data 146. The W data stored in the reference W-data storing area 1124 are hereinafter referred to as reference W data. The W data is referred to for judging as to whether a predetermined pixel is in a position to consist of an outline of a white area in the white outline removal process, which will be described later in detail. In S16, the white outline removal process is executed.

As shown in FIG. 15, when the white outline removal process starts, in S31, one of pixels which composes the image data 141 is targeted as a currently marked pixel. In S32, it is examined as to whether a W-scale value of a pixel in the CMYKW data 146 (alternatively the reference W data) corresponding to the marked pixel is zero. If the W-scale value of the examined pixel is zero (S32: YES), it is determined that the marked pixel is not in the white outline area; therefore, the process proceeds to S37.

In S32, if the W-scale value of the examined pixel is not zero (S32: NO), in S33, the remaining scale values of the C, M, Y, and K of the marked pixel are examined. Specifically, it is examined as to whether all of the C, M, Y, K scale values are zero. If the C, M, Y, K scale values are zero (C=M=Y=K=0) (S33: YES), it is determined that the marked pixel is to be painted in white in order to form a white area, rather than to form a base layer. The process proceeds to S37.

In S33, if all of the C, M, Y, K scale values are not zero (S33: NO), in S34, it is examined as to whether the marked pixel is a pixel to compose an outline of a white area. Specifically, in an x-y coordinate, in which a length between centers of two adjoining pixels is a basic unit, when a position of the marked pixel is the original point (0, 0), a position (n, y) of each pixel other than the marked pixel is examined as to whether $(x/n)^2+(y/n)^2$ is less than or equal to 1. When the coordinates (x, y) of the examined pixel corresponds to $(x/n)^2+(y/n)^2 \leq 1$, the pixel is reserved for further examination in S35. Namely, this is to examine as to whether a length between the examined pixel and the marked pixel is less than or equal to n, which indicates the range to be removed from the outline of the white area. In S35, it is examined with reference to the reference W data as to whether the reserved pixels include a pixel with its W-scale value being zero. If a pixel with its W-scale value being zero (i.e., a pixel not to be painted in any ink) is found (S35: YES), it is determined that the n range with respect to the marked pixel includes at least a part of an outline of a white area. Thus, it is determined that the marked pixel is a white outline pixel, which is a pixel in the outline of the white area. Accordingly, in S36, the W-scale value of the marked pixel in the CMYKW data 146 is cleared to zero. The process proceeds to S37. In S36, if no pixel with the W-scale value being 0 is found in the reserved pixels (S35: NO), the process proceeds to S37.

In S37, it is judged as to whether the above process is applied to all the pixels included in the image data 141. If a pixel remains unprocessed (S37: NO), the process returns to S31, and a next pixel is targeted as a marked pixel. If all the pixels are processed (S37: YES), the process returns to the print data generating process. According to the white outline removal process as described above, the white outline data removal data 147 is created based on the CMYKW data 146.

Following S16 in FIG. 10, in S17, a random dithering process is applied to the outline-removed white data 147 stored in the converted CMYKW data storing area 1123. Accordingly, the outline-removed white data 147 is binarized in the CMYKW format and converted into the print data 148 to be stored in the print data storing area 1125 of the RAM 112. Thereafter, the print data generating process is terminated.

Figure 16:
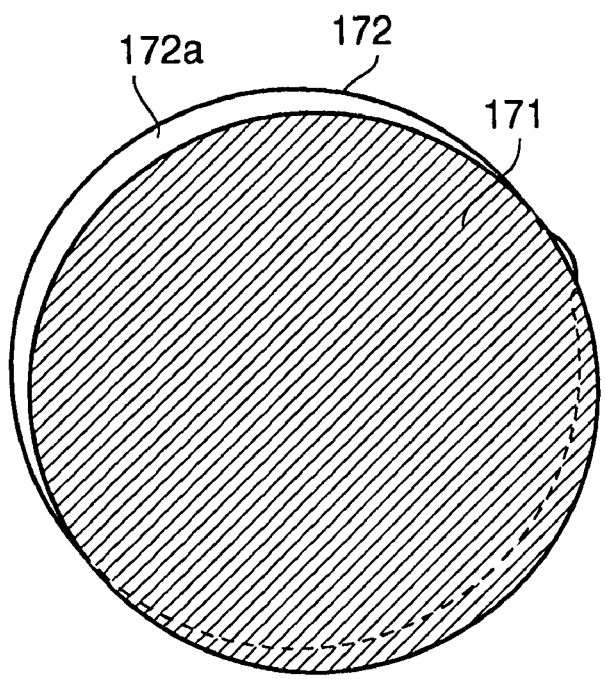
FIG. 16 illustrates a printed output according to conventionally-generated print data.
Figure 17:
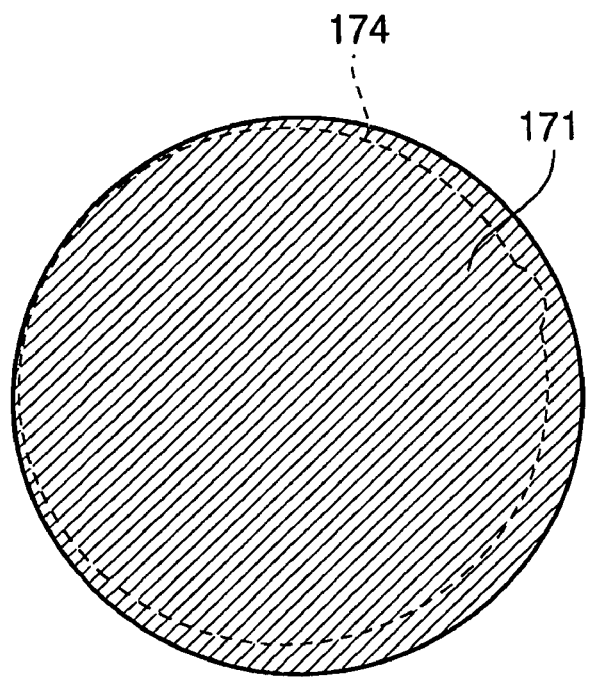
FIG. 17 illustrates a printed output according to print data generated in accordance with the first embodiment of the present invention.

Next, referring to FIGS. 16 and 17, a printed output according to print data generated in a conventional method and a printed output according to the print data generating process according to the present embodiment will be described. FIG. 16 illustrates the printed output according to conventionally-generated print data. FIG. 17 illustrates the printed output according to the print data generated in accordance with the first embodiment of the present invention.

FIG. 16 shows the printed output, in which a colored area 171 painted in a colored ink does not overlaid to fit in a white area 172 being a base layer, and the white area 172 partially obtrudes out of the colored area 171 at an obtruded area 172a. Because brightness of white in the obtruded area 172a is higher than brightness of the other CMYK colors, obtrusion of the obtruded area 172a can be more noticeable than and obtrusion of the other colors, and quality of the printed output may be undesirably degraded.

On the contrary, according to the PC 100 in the present embodiment, the image data 141 in the sRGB format is converted in the CMYKW data 146 including the W data. As the print data is generated based on the CMYKW data 146, W-scale values of pixels in outlines of white areas are replaced with zero. In accordance with the print data, as shown in FIG. 17, the white area 174 with outlines thereof being removed is printed. Thus, even when the colored ink is misaligned with respect to the white ink or when the white ink blots on the recording medium, obtrusion of the white ink can be prevented, and tones of the colors in the printed output can be prevented from being changed noticeably. Therefore, quality of the printed output can be maintained.

According to the present embodiment, W-scale values of the pixels to be presented in white are not cleared to zero when the print data is generated; therefore, color information of the area to be painted in white can be maintained unchanged. Further, the user is allowed to determine the range of the white outline to be removed by entry of the n value or by selecting a type of the recording medium so that the print data for a printed output, in which the outlines of the white areas are preferably removed, is generated.

Figure 18:
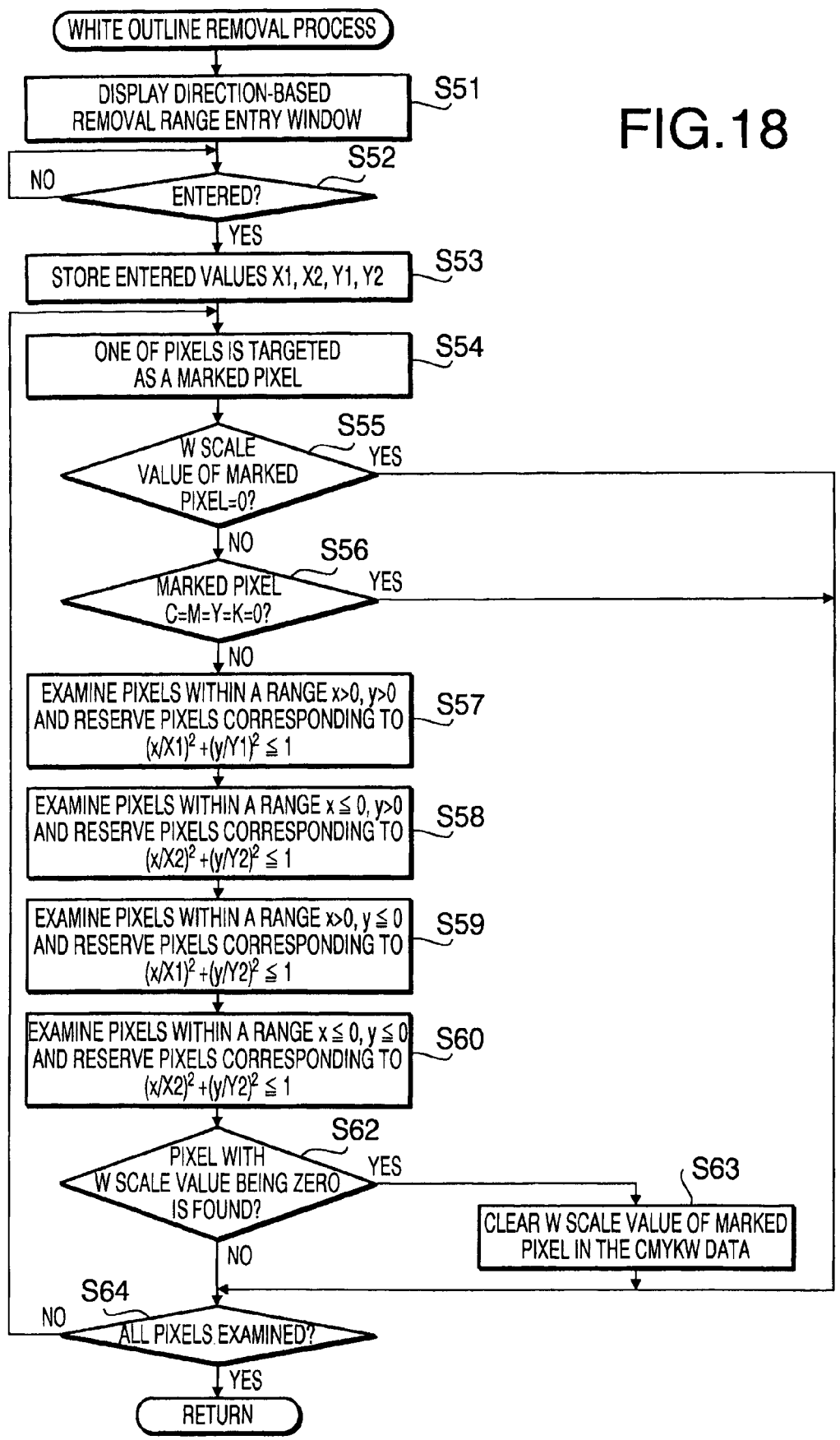
FIG. 18 is a flowchart to illustrate the white outline removal process to be executed in the PC according to a second embodiment of the present invention.
Figure 19:
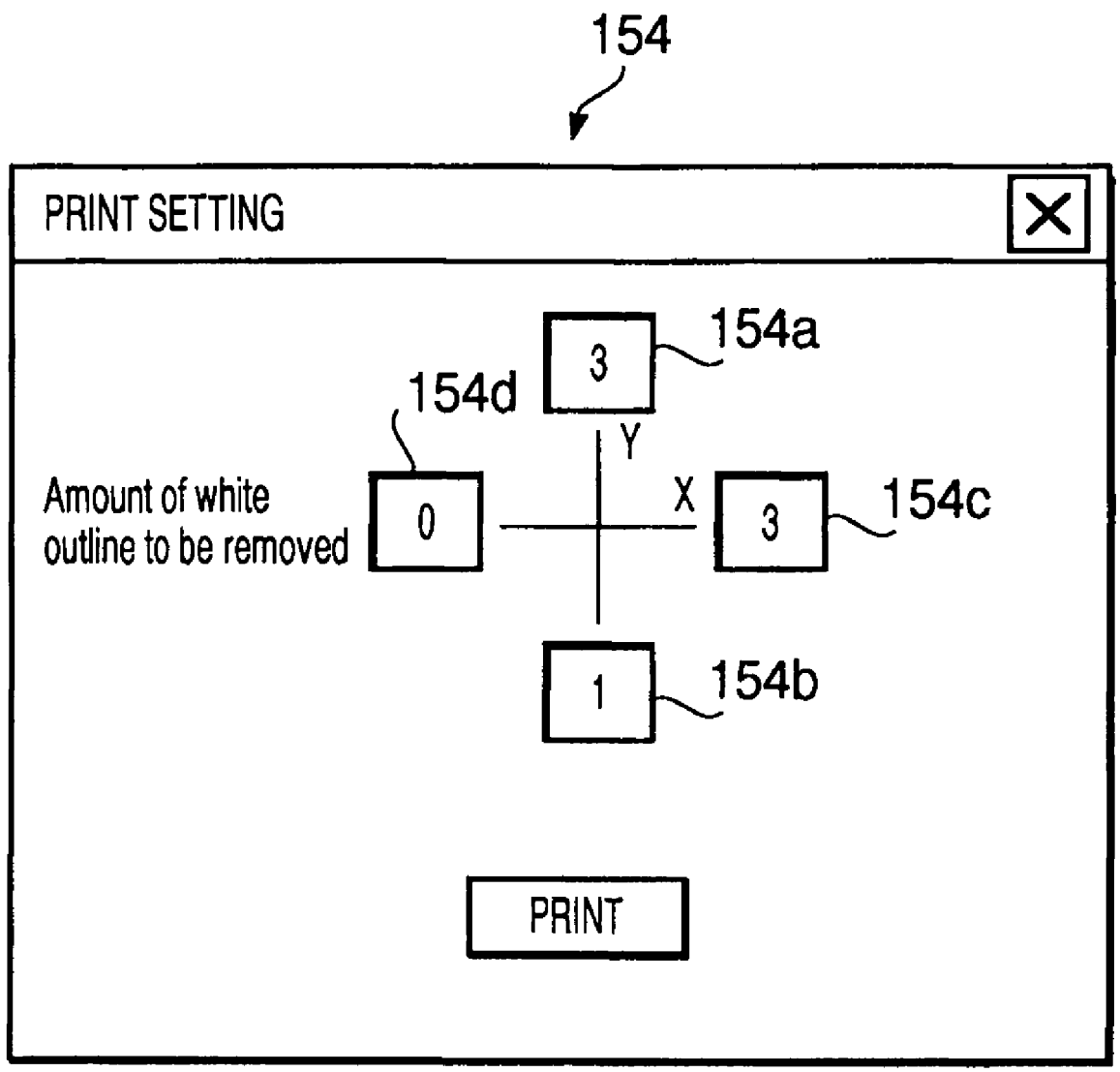
FIG. 19 illustrates a window to input amounts of the white outline areas to be removed, which is displayed on the monitor screen according to the second embodiment of the present invention.

Next, a second embodiment according to the present invention will be described with reference to FIGS. 10, 18, and 19. FIG. 18 is a flowchart to illustrate a white outline removal process to be executed in a PC 200 according to the second embodiment of the present invention. FIG. 19 illustrates a window 154 to input amounts of the white outline areas to be removed, which is displayed on a screen of the monitor 133 according to the second embodiment of the present invention.

The PC 200 according to the second embodiment is a PC configured similarly to the PC 100 in the first embodiment, but different in a feature that a user can set a range of the white outline to be removed based on four directions. The configuration of the PC 200 is identical with the PC 100 except processes shown in FIGS. 10 and 18. Therefore, a structure in the PC 200 similar to that of PC 100 is referred to by an identical reference numeral, and description of that will be omitted.

In the second embodiment, when the print data generating process shown in FIG. 10 is executed, the outline removal range setting process in S12 is skipped. Therefore, following S11, the image data 141 is converted into the CMYKW data 146 so that the white outline removal process is applied to the converted CMYKW data 146 in S16.

In the white outline removal process according to the second embodiment, in S51, a direction-based removal range entry window 154 (FIG. 19), in which the user can enter values indicating the range of the outline to be removed on a direction basis, is displayed on the screen of the monitor 133.

The direction-based removal range entry window 154 is provided with four entry fields 154a, 154b, 154c, 154d, in which the user enters four values for four directions (up, down, right, and left) indicating a range (thickness) of a white outline to be removed on a pixel basis. In S52, it is determined as to whether the values are entered in the entry fields 154a-154d. When no value is entered (S52: NO), S52 is repeated. When the values are entered (S52: YES), in S53, the entered values are stored in the outline removal range storing area 1122. Specifically, the values entered in an up-direction entry field 154a, a down-direction entry field 154b, a right-direction entry field 154c, and a left-direction entry field 154d, are respectively stored to be "Y1," "Y2," "X1," and "X2."

Following S53, in S54, one of pixels which composes the image data 141 is targeted as a marked pixel. Thereafter, in S55, it is examined as to whether a W-scale value of a pixel in the CMYKW data 146 (alternatively the reference W data) corresponding to the marked pixel is zero. If the W-scale value of the corresponding pixel is zero (S55: YES), it is determined that the marked pixel is not in the white outline area, and the process proceeds to S64. If the W-scale value of the corresponding pixel is not zero (S55: NO), in S56, the remaining scale values of the C, M, Y, and K of the marked pixel are examined with reference to the CMYK data 146. If the C, M, Y, K scale values are zero (C=M=Y=K=0) (S56: YES), it is determined that the marked pixel is to be painted in white in order to form a white area, rather than to form a base layer. The process proceeds to S64.

In S56, if all of the C, M, Y, K scale values are not zero (S56: NO), in S57, it is examined as to whether the marked pixel is a pixel to compose an outline of a white area. Specifically, in an x-y coordinate, in which a length between centers of two adjoining pixels is a basic unit, when a position of the marked pixel is the original point (0, 0), a position (n, y) of each pixel, among pixels within a range with x being larger than zero (x>0) and y being larger than zero (y>0), is examined as to whether $(x/X1)^2+(y/Y1)^2$ is less than or equal to 1. When the coordinates (x, y) of the examined pixel corresponds to $(x/X1)^2+(y/Y1)^2 \leq 1$, the pixel is reserved. Thereafter, in S58, a position (n, y) of each pixel, among pixels within a range with x being smaller than or equal to zero (x≦0) and y being larger than zero (y>0), is examined as to whether $(x/X2)^2+(y/Y2)^2$ is less than or equal to 1. When the coordinates (x, y) of the examined pixel corresponds to $(x/X2)^2+(y/Y2)^2 \leq 1$, the pixel is reserved. Further, in S59, a position (n, y) of each pixel, among pixels within a range with x being larger than zero (x>0) and y being smaller than or equal to zero (y≦0), is examined as to whether $(x/X1)^2+(y/Y2)^2$ is less than or equal to 1. When the coordinates (x, y) of the examined pixel corresponds to $(x/X1)^2+(y/Y2)^2 \leq 1$, the pixel is reserved. Furthermore, in S60, a position (n, y) of each pixel, among pixels within a range with x being smaller than or equal to zero (x≦0) and y being smaller than or equal to zero (y≦0), is examined as to whether $(x/X2)^2+(y/Y2)^2$ is less than or equal to 1. When the coordinates (x, y) of the examined pixel corresponds to $(x/X2)^2+(y/Y2)^2 \leq 1$, the pixel is reserved.

Following S60, in S62, it is examined with reference to the reference W data as to whether the reserved pixels include a pixel with its W-scale value being zero. If a pixel with its W-scale value being zero is found (S62: YES), in S63, the W-scale value of the marked pixel in the CMYKW data 146 is cleared to zero. The process proceeds to S64. In S64, if no pixel with the W-scale value being 0 is found in the reserved pixels (S62: NO), the process proceeds to S64. In S64, it is judged as to whether the above process is applied to all the pixels included in the image data 141. If a pixel remains unprocessed (S64: NO), the process returns to S54, and a next pixel is targeted as a marked pixel. If all the pixels are processed (S64: YES), the process returns to the print data generating process. According to the white outline removal process as described above, the white outline data removal data 147 is created based on the CMYKW data 146.

According to the second embodiment, the PC 200 is enabled to judge as to whether a pixel is in the white outline which is defined by the four direction-based values entered by the user. Thus, for example, when it is anticipated that the colored inks is misaligned on the recording medium in a specific direction with respect to the white ink, the user can arbitrarily set the thickness (i.e., range) of the white outline to be removed.

Figure 20:
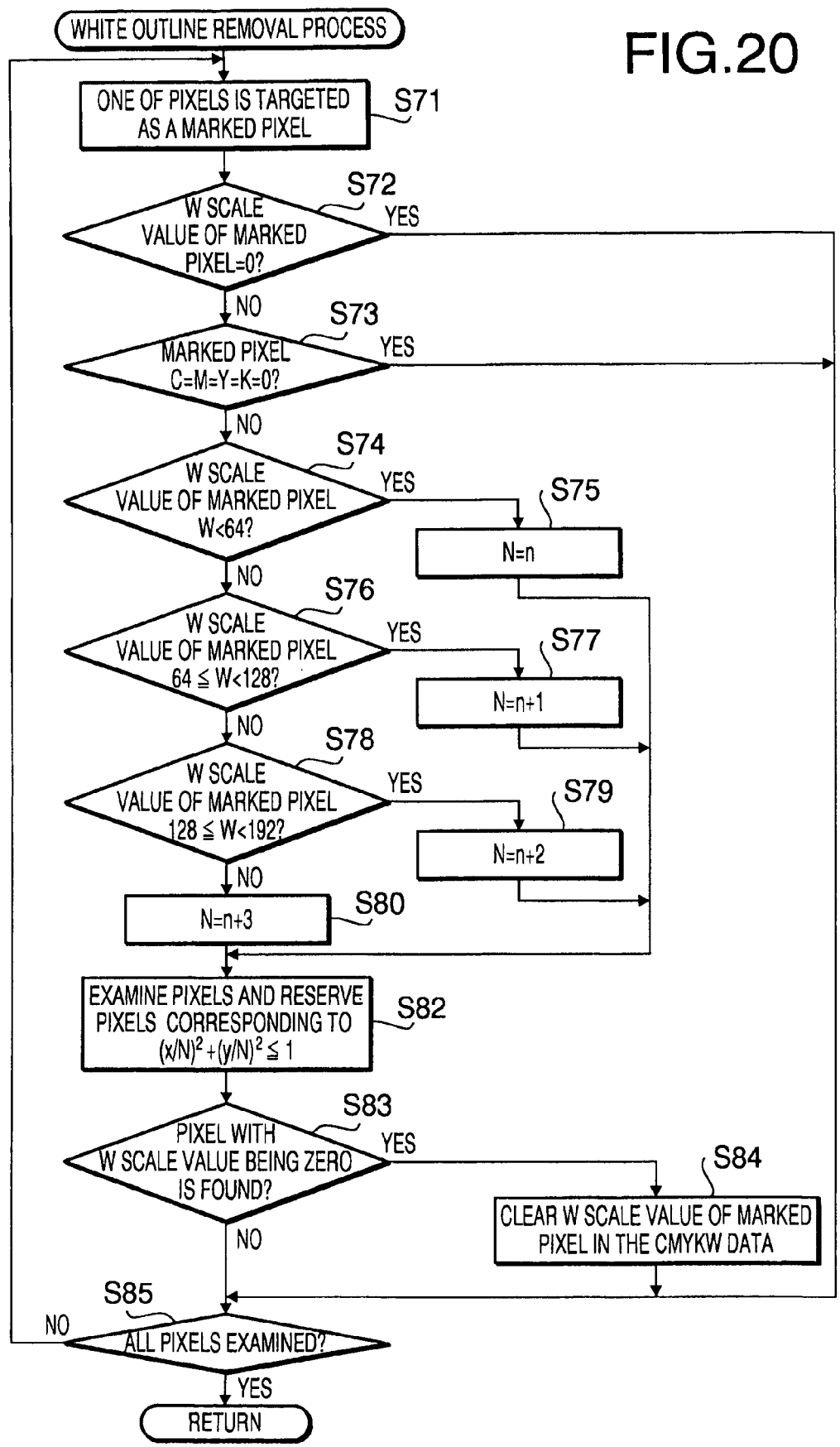
FIG. 20 is a flowchart to illustrate the white outline removal process to be executed in the PC according to a third embodiment of the present invention.

Next, with reference to FIG. 20, a third embodiment according to the present invention will be described. FIG. 20 is a flowchart to illustrate a white outline removal process to be executed in a PC 300 according to the third embodiment of the present invention. The PC 300 according to the third embodiment is a PC configured similarly to the PC 100 in the first embodiment, but different in a feature that, when judging as to whether the marked pixel is in the pixel included in the outline of a white area, the range to examine the pixels is changed according to a W-scale value of the marked pixel. The configuration of the PC 300 is identical with the PC 100 except processes shown in FIG. 20. Therefore, a structure in the PC 300 similar to that of PC 100 is referred to by an identical reference numeral, and description of that will be omitted.

As shown in FIG. 20, when the white outline removal process starts, in S71, one of pixels which composes the image data 141 is targeted as a marked pixel. In S72, it is examined as to whether a W-scale value of a pixel in the CMYKW data 146 (alternatively, the reference W data) corresponding to the marked pixel is zero. If the W-scale value of the corresponding pixel is zero (S72: YES), it is determined that the marked pixel is not in the white outline area; therefore, the process proceeds to S85.

In S72, if the W-scale value of the corresponding pixel, i.e., the marked pixel, is not zero (S72: NO), in S74, it is examined as to whether the W-scale value of the marked pixel is smaller than 64. If the W-scale value is smaller than 64 (S74: YES), it is assumed that an amount of the white ink to be ejected to form a base layer is relatively small. Therefore, in S75, an n value stored in the outline removal range storing area 1122 of the RAM 112 is set to be an N value, which indicates a range of pixels to be examined as to whether the corresponding pixel composes a white outline. The process proceeds to S82.

In S74, if the W-scale value of the corresponding pixel is greater than or equal to 64 (S74: NO), in S76, it is examined as to whether the W-scale value is smaller than 128. If the W-scale value is smaller than 128 (S76: YES), in S77, a value (n+1) is set to be the N value. The process proceeds to S82.

In S76, if the W-scale value of the corresponding pixel is greater than or equal to 128 (S76: NO), in S78, it is examined as to whether the W-scale value is smaller than 192. If the W-scale value is smaller than 192 (S78: YES), in S79, a value (n+2) is set to be the N value. The process proceeds to S82. In S78, if the W-scale value of the corresponding pixel is larger than or equal to 192 and smaller than or equal to 255 (192≦W≦255) (S78: NO), in S80, a value (n+3) is set to be the N value. The process proceeds to S82.

In S82, it is examined as to whether the marked pixel is a pixel to compose an outline of a white area. Specifically, when a position of the marked pixel is the original point (0, 0), a position (n, y) of each pixel within the range determined by the N value is examined as to whether $(x/N)^2+(y/N)^2$ is less than or equal to 1. In S82, when the coordinates (x, y) of the examined pixel corresponds to $(x/N)^2+(y/N)^2 \leq 1$, the pixel is reserved for further examination in S83. In S83, it is examined with reference to the reference W data as to whether the reserved pixels include a pixel with its W-scale value being zero. If a pixel with its W-scale value being zero is found (S83: YES), in S84, the W-scale value of the marked pixel in the CMYKW data 146 is cleared to zero. The process proceeds to S85. In S85, it is judged as to whether the above process is applied to all the pixels included in the image data 141. If a pixel remains unprocessed (S85: NO), the process returns to S71, and a next pixel is targeted as a marked pixel. If all the pixels are processed (S85: YES), the process returns to the print data generating process.

According to the PC 300 in the third embodiment, when judging as to whether the marked pixel is in the pixel included in the outline of a white area, and when the W-scale value of the marked pixel becomes greater, the wider range of pixels are examined. Therefore, in addition to avoiding misalignment of the colored inks with respect to the base layer, it can be expected that an area, in which otherwise a larger amount of white ink is to be ejected, is less likely to have blots of the white ink.

Although examples of carrying out the invention have been described, those skilled in the art will appreciate that there are numerous variations and permutations of the print data generating device that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the data formats to be used in the PCs 100, 200, 300 are not limited to sRGB format or CMYKW format. In the above embodiments, the image data 141 in sRGB format is converted into the print data 148 in the CMYKW format. However, the image data 141 may be represented in CMYKW format or a data format to represent another color space such as HSV format. The color conversion table 161 and the white conversion table 162 can be replaced with another tables to define the correspondences between one data format and the other data format accordingly. Further, the data format of the print data 148 can be replaced with a data format other than CMYKW format, and the scale of the color data is not limited to 256.

Furthermore, the configuration of the inkjet printer 1 is not limited. In place of the first carriage 10 with the inkjet heads 11-14 for ejecting white ink and the second carriage 20 with the inkjet heads 21-24 for ejecting colored inks, one carriage with five inkjet heads may be used in the inkjet printer to output the print data generated by the print data generating device according to the present invention. For another example, the inkjet printer may not necessarily be equipped with the black ink.

In the white outline removal processes shown in FIGS. 15, 18, 20, when the C, M, Y, K scale values of the examined pixel are zero in S33, S56, S73, the W-scale value of the marked pixel corresponding to the examined pixel is prevented from being cleared to zero. However, these steps can be omitted. In the above embodiments, the range of the outline to be removed is set according to the user's input; however, the n value indicating the range to be removed can be stored in a memory area in, for example, the HDD 116 so that the range to be removed is fixed to a predetermined value. In this configuration, the user's operations to the PCs 100, 200, 300, i.e., the user's workload can be reduced. Furthermore, a type of the recording medium to be used can be automatically determined by a sensor so that the range of the white outline to be reduced can be set without the user's input.

In the white outline removal process according to the second embodiment (see FIG. 18), all the pixels in the white outline area are examined in S57-S60 prior to the judgment in S62 as to whether the W-scale values of the reserved pixels are zero so that the W-scale value of the marked pixel is cleared when one pixel with its W-scale value being zero is found among the reserved pixels. However, the judgment can be made each time the examined pixel is reserved, and the W-scale value of the marked pixel can be cleared to zero once the W-scale value of the reserved pixel is found to be zero. Further, the range of the white outline to be removed may not necessarily be determined based on the four directions, but may be determined based on only directions in which the colored inks are anticipated to be misaligned with respect to the white ink. In this configuration, when judging as to whether the marked pixel is a pixel to compose the white outline, the range of the pixels to be examined is determined by the directions and the values entered by the user. Furthermore, a closed curve to include the marked pixel can be arbitrarily set so that pixels within the closed curve can be examined to find a pixel with a W-scale value being zero. In this configuration, pixels in the white outline can be removed according to the amount to be removed based on the direction of the closed curve regardless of directions of the white outlines extending in the image.

It is to be noted that the third embodiment can also be modified. For example, the third embodiment can be combined with the second embodiment, and a predetermined value may be added to the four values (X1, X2, Y1, Y2) indicating the range of a white outline to be removed according to the W-scale value of the marked pixel. For another example, in the white outline removal process shown in FIG. 20, when the W-scale value of a marked pixel is smaller, a larger value can be subtracted from the n value to obtain the N value which defines the range of the pixels to be examined.

What is claimed is:

1. A print data generating apparatus to generate print data, which is to be used in a printing apparatus to form an image including a pixel-in-white and a base layer pixel, based on originally inputted image data representing the image, comprising:

a color data generating unit configured to generate color data, which indicates color scale values of multiple colors being used in the image, based on the inputted image data;

a white data generating unit configured to generate white data, which indicates color scale values of white being used in the image including the pixel-in-white and the base layer pixel, based on the inputted image data;

a pixel marking unit configured to determine one of pixels in a white area to be a marked pixel, the white area being an area to be formed at least in a white colorant and including one of the pixel-in white and the base layer pixel;

an examining unit configured to examine pixels within a predetermined range with respect to the marked pixel as to whether at least one of the examined pixels has the color scale value of white being zero, the predetermined range to be examined by the examining unit becoming greater when the color scale value of the white of the marked pixel is larger;

a white outline pixel judging unit configured to examine the marked pixel among pixels included in the white area to judge as to whether the marked pixel is a white outline pixel composing an outline of the white area with reference to the white data, the white outline pixel judging unit being configured to determine that the marked pixel is the white outline pixel when at least one of the examined pixels has the color scale value of white being zero; and an outline-removed white data generating unit configured to generate outline-removed white data, which includes information to indicate that the outline of the white area is removed; and the outline-removed white data generating unit is configured to remove the outline of the white area by clearing the color scale values of white of the white outline pixel to zero.

2. The print data generating apparatus according to claim 1, further comprising:

a converting unit configured to convert the inputted image data into colorant-enabled data, which is in a format capable of reproducing the image in a plurality of colors of colorants including white; and a removal canceling unit configured to prevent the color scale values of the colors of the marked pixel other than white from being removed by the outline-removed white data generating unit when the color scale values of the colors other than white of the marked pixel in the colorant-enabled data are zero.

3. The print data generating apparatus according to claim 1, wherein the white outline pixel judging unit determines that the marked pixel is the white outline pixel when the marked pixel is within the white outline which is in a predetermined thickness, defined by a number of pixels, from edges of the white area.

4. The print data generating apparatus according to claim 1, further comprising:

a memory unit configured to store a table which defines a correspondence between a predetermined thickness of the outline of the white area with a preferable type of recording medium to be used in the printing apparatus; and an input unit configured to input the type of recording medium to be used with the print data generated in the print data generating apparatus;

wherein the white outline pixel judging unit judges as to whether the marked pixel is the white outline pixel according to the predetermined thickness determined based on the inputted type of the recording medium with reference to the table stored in the memory unit.

5. The print data generating apparatus according to claim 1, further comprising:

a thickness input unit configured to input a thickness of the outline of the white area, wherein the white outline pixel judging unit judges as to whether the marked pixel is the white outline pixel based on the thickness inputted by the thickness input unit.

6. The print data generating apparatus according to claim 1, further comprising:

a direction-basis thickness input unit configured to input thickness of the outline of the white area based on directions of the white area to expand in the image, wherein the white outline pixel judging unit judges as to whether the marked pixel is the white outline pixel according to the inputted thicknesses in the respective directions.

7. A method to generate print data to be used in a printing apparatus to form an image including a pixel-in-white and a base layer pixel, based on originally inputted image data representing the image, comprising:

generating color data, which indicates color scale values of multiple colors being used in the image, based on the inputted image data;

generating white data, which indicates color scale values of white being used in the image including the pixel-in-white and the base layer pixel, based on the inputted image data;

determining one of pixels in a white area to be a marked pixel, the white area being an area to be formed at least in a white colorant and including one of the pixel-in white and the base layer pixel;

examining pixels within a predetermined range with respect to the marked pixel as to whether at least one of the examined pixels has the color scale value of white being zero, the predetermined range to be examined becoming greater when the color scale value of the white of the marled pixel is larger;

examining the marked pixel among pixels included in the white area to judge as to whether the marked pixel is a white outline pixel composing an outline of the white area with reference to the white data, and determining that the marked pixel is the white outline pixel when at least one of the examined pixels has the color scale value of white being zero; and generating outline-removed white data, which includes information to indicate that the outline of the white area is removed; and removing the outline of the white area by clearing the color scale values of white of the white outline pixel to zero.

8. A non-transitory computer-readable storage medium that stores a computer-executable program, the program comprising instructions to control a computer to generate print data, which is to be used in a printing apparatus to form an image including a pixel-in-white and a base layer pixel, based on originally inputted image data representing the image, by executing steps of:

generating color data, which indicates color scale values of multiple colors being used in the image, based on the inputted image data;

generating white data, which indicates color scale values of white being used in the image including the pixel-in-white and the base layer pixel, based on the inputted image data;

determining one of pixels in the white area to be a marked pixel, the white area an area to be formed at least in a white colorant and including one of the pixel-in white and the base layer pixel;

examining pixels within a predetermined range with respect to the marked pixel as to whether at least one of the examined pixels has the color scale value of white being zero, the predetermined range to be examined becoming greater when the color scale value of the white of the marked pixel is larger;

examining the marked pixel among pixels included in the white area to judge as to whether the marked pixel is a white outline pixel composing an outline of the white area with reference to the white data, and determining that the marked pixel is the white outline pixel when at least one of the examined pixels has the color scale value of white being zero; and generating outline-removed white data, which includes information to indicate that the outline of the white area is removed; and removing the outline of the white area by clearing the color scale values of white of the white outline pixel to zero.

* * * * *